US008353319B2

(12) United States Patent
Bonner

(10) Patent No.: US 8,353,319 B2
(45) Date of Patent: Jan. 15, 2013

(54) LIQUID DELIVERY SYSTEM FOR SUPPLYING LIQUID FROM A PORTABLE CONTAINER TO AT LEAST ONE SELECTED REMOTE DESTINATION AND REMOVING VAPOUR FROM THE AT LEAST ONE SELECTED REMOTE DESTINATION

(75) Inventor: Mark Bonner, Frenchtown, NJ (US)

(73) Assignee: Fuel Transfer Technologies Inc., Moncton, New Brunswick (CA)

( * ) Notice: Subject to any disclaimer, the term of this patent is extended or adjusted under 35 U.S.C. 154(b) by 1480 days.

(21) Appl. No.: 11/621,548

(22) Filed: Jan. 9, 2007

(65) Prior Publication Data

US 2007/0227621 A1 Oct. 4, 2007

Related U.S. Application Data

(60) Provisional application No. 60/757,227, filed on Jan. 9, 2006.

(51) Int. Cl.
*B65B 31/00* (2006.01)
*B60P 3/22* (2006.01)

(52) U.S. Cl. ............ 141/59; 141/67; 141/231; 222/608; 222/628

(58) Field of Classification Search ................ 141/2, 18, 141/59, 67, 231, 323; 222/608, 628
See application file for complete search history.

(56) References Cited

U.S. PATENT DOCUMENTS 2,495,905 A * 1/1950 Pogue .......................... 137/205
3,635,264 A 1/1972 Milburn
3,774,654 A * 11/1973 Hjermstad ...................... 141/42
3,807,465 A * 4/1974 Ginsburgh et al. ........... 141/285
4,095,626 A 6/1978 Healy
4,570,686 A 2/1986 Devine
4,649,969 A 3/1987 McMath
4,746,036 A 5/1988 Messner (Continued)

FOREIGN PATENT DOCUMENTS

EP 0326842 A1 9/1989

OTHER PUBLICATIONS

Intellectual Property Office of New Zealand, "Examination Report", for corresponding New Zealand Patent Application No. 570357 dated Oct. 11, 2011, New Zealand.

(Continued)

*Primary Examiner* — Timothy L Maust
(74) *Attorney, Agent, or Firm* — Norton Rose Canada LLP

(57) ABSTRACT

A liquid delivery system for supplying liquid from a portable container to a destination and removing vapor from the destination comprises a portable container, an elongate flexible liquid delivery hose, and an elongate flexible vapor recovery hose. The liquid delivery hose receives liquid from the portable container, and delivers the received liquid to a remote destination. The vapor recovery hose receives vapor from the remote destination, and delivers the received vapor to the substantially hollow interior of the portable container. The liquid delivery hose and the vapor recovery hose permit the movement of the liquid outlet of the liquid delivery hose to more than one selected remote destination while the container remains substantially stationary. Reduced air pressure in the portable container resulting from the removal of the liquid therefrom, causes vapor to be suctioned via the vapor recovery hose into the portable container.

55 Claims, 26 Drawing Sheets

U.S. PATENT DOCUMENTS

| | | | | |
|---|---|---|---|---|
| 4,834,270 | A | 5/1989 | Messner | |
| 5,156,199 | A | 10/1992 | Hartsell, Jr. et al. | |
| 5,230,374 | A * | 7/1993 | Dawson et al. | 141/231 |
| 5,244,021 | A * | 9/1993 | Hau | 141/285 |
| 5,341,855 | A | 8/1994 | Rabinovich | |
| 5,522,440 | A | 6/1996 | Mitchell | |
| 5,620,030 | A | 4/1997 | Dalhart et al. | |
| 5,694,988 | A * | 12/1997 | Collins | 141/59 |
| 5,711,355 | A * | 1/1998 | Kowalczyk | 141/382 |
| 5,967,385 | A | 10/1999 | Coates, III | |
| 5,988,458 | A | 11/1999 | Messner | |
| 6,068,163 | A * | 5/2000 | Kihm | 222/189.1 |
| 6,176,275 | B1 | 1/2001 | Hill | |
| 6,945,286 | B2 * | 9/2005 | Freeman | 141/59 |
| 7,077,297 | B1 | 7/2006 | Valentini et al. | |
| 7,089,975 | B2 | 8/2006 | Chrisco et al. | |
| 7,735,672 | B2 * | 6/2010 | Voss, III | 220/202 |
| 7,793,801 | B2 * | 9/2010 | Drummond | 222/179 |
| 8,100,302 | B2 * | 1/2012 | Bonner | 222/401 |
| 2005/0274127 | A1 | 12/2005 | Drube et al. | |
| 2006/0081657 | A1 * | 4/2006 | Bonner | 222/401 |
| 2009/0194192 | A1 * | 8/2009 | Bonner | 141/59 |
| 2010/0236658 | A1 * | 9/2010 | Voss, III | 141/59 |

OTHER PUBLICATIONS

Saputra, Maruli—Australian Patent Office, "Examiner's First Report" for corresponding Australian Patent Application No. 2007204557, dated Nov. 8, 2010, Australia.

Negler, Justin—Davies Collison Cave, "Response to Examiner's First Report" for corresponding Australian Patent Application No. 2007204557, dated Aug. 8, 2012, Australia.

Fearn, Mike—Intellectual Property Office of New Zealand, Examination Report for corresponding New Zealand Patent Application No. 570357, dated Mar. 17, 2010, Australia.

Negler, Justin—Davies Collison Cave, "Response to Examination Report" for corresponding New Zealand Patent Application No. 570357, dated Sep. 14, 2011, Australia.

Graham, Benjamin—Intellectual Property Office of New Zealand, "Examination Report" for corresponding New Zealand Patent Application No. 570357, dated Oct. 11, 2011, New Zealand.

Negler, Justin—Davies Collison Cave, "Response to Examination Report" for corresponding New Zealand Patent Application No. 570357, dated Apr. 27, 2012, Australia.

Canadian Intellectual Property Office, "International Search Report" for corresponding International Application No. PCT/CA2007/000025, dated May 29, 2007, Canada.

* cited by examiner

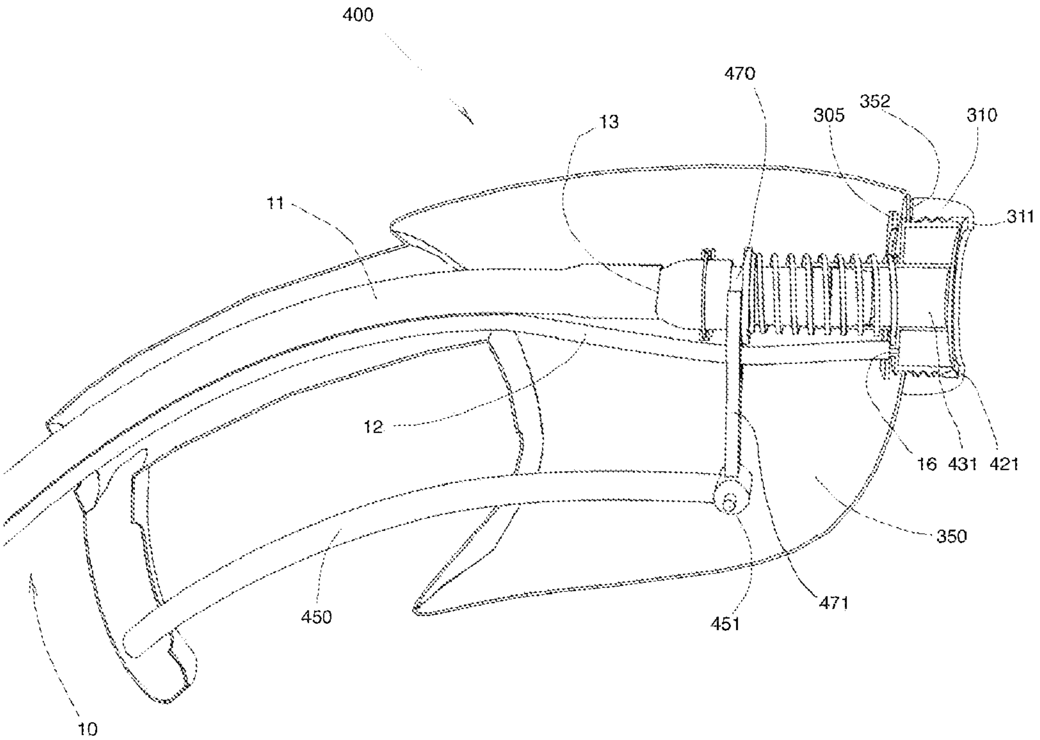
FIGURE 16A
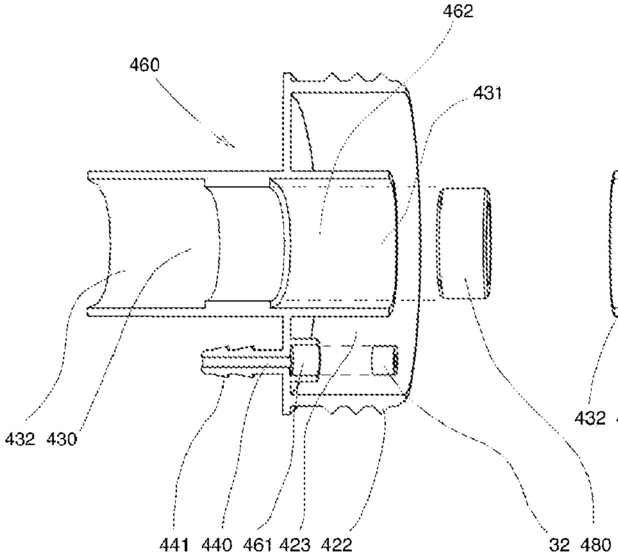
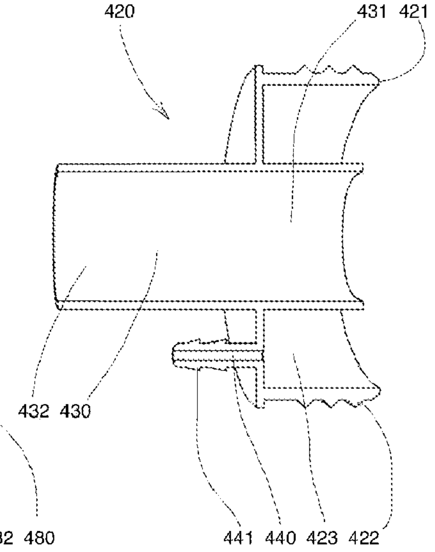
FIGURE 16C
FIGURE 16B

LIQUID DELIVERY SYSTEM FOR SUPPLYING LIQUID FROM A PORTABLE CONTAINER TO AT LEAST ONE SELECTED REMOTE DESTINATION AND REMOVING VAPOUR FROM THE AT LEAST ONE SELECTED REMOTE DESTINATION

This application claims the benefit of the filed U.S. Provisional Patent Application No. 60/757,227, filed Jan. 9, 2006, entitled Two Line Hose Vapor Recovery System, which is here by incorporated by reference.

FIELD OF THE INVENTION

The present invention relates to liquid delivery systems for supplying liquid from a portable container, and more particularly to liquid delivery systems for supplying liquid from a portable container and removing vapor from at least one selected remote destination.

BACKGROUND OF THE INVENTION

It is common to store liquids, such as fuel, in portable containers for subsequent delivery into another container or the like, at a remote destination. The remote receptacle might be the fuel tank of an apparatus having an external combustion engine, such as a vehicle, a boat, a lawn mower, and so on, or might be another independent container.

Most of such portable containers have a rigid nozzle securely attached thereto at an upper outlet. In order to deliver liquid from the portable container, the portable container is lifted and tilted, and liquid is poured from the spout into the remote container.

Further, a few of such portable containers have an elongate hose attached to the portable container at an outlet, with a nozzle and spout attached to the free and of the hose. The spout is placed partially into the remote container, and liquid is delivered from the portable container to the remote container, typically by means of siphoning, and possibly pumping.

One problem that exists with the use of such portable containers is that vapor from the delivered liquid tends to escape from the remote destination. In the case of transferring liquid fuel, this is highly undesirable. Indeed, it is believed that legislation exists, or is about to be enacted, in some jurisdictions, to require the recovery of vapor when delivering fuel from a portable container. One such prior art device that attempts to recover such vapors is described in U.S. Pat. No. 5,711,355 entitled Portable Liquid Transfer Container and Dispensing Nozzle with Non-movable Part Free Flow, Vapor Recovery and Overfill Prevention System, issued Jan. 27, 1998, to Kowalczyk. This Portable Liquid Transfer Container and Dispensing Nozzle comprises a non-movable part portable liquid transfer container with the dispensing nozzle, and includes a fillpipe sealing device and internal conduit positioned in such a manner as to enable free-flow of liquid and recovery of vapors displaced during the gravity transfer of liquids to other containers, as well as automatic shutoff of liquid transfer when the receiving container is full to prevent overfill and spillage of liquid. Unfortunately, this portable liquid transfer container is limited to use where it is raised above the level of the receiving container, and tilted so that liquid flows from the dispensing nozzle into the receiving container. It cannot be used in a more convenient manner such as where liquids are siphoned or pumped from one container to another.

It is an object of the present invention to provide a liquid delivery system for supplying liquid from a portable container to at least one selected remote destination and removing vapor from said at least one selected remote destination, wherein the liquid delivery system is not limited to use where it is raised above the level of the receiving container, and tilted so that liquid flows from the dispensing nozzle into the receiving container.

It is another object of the present invention to provide a liquid delivery system for supplying liquid from a portable container to at least one selected remote destination and removing vapor from said at least one selected remote destination, wherein the liquid delivery system can be used in a more convenient manner such as where liquids are pumped from one container to another.

It is a further object of the present invention to provide a liquid delivery system for supplying liquid from a portable container to at least one selected remote destination and removing vapor from said at least one selected remote destination, wherein the liquid delivery system can be used with or without a pump.

SUMMARY OF THE INVENTION

In accordance with one aspect of the present invention there is disclosed a novel liquid delivery system for supplying liquid from a portable container to at least one selected remote destination and removing vapor from the at least one selected remote destination. The liquid delivery system comprises a portable container having a substantially hollow interior for retaining liquid therein. An elongate flexible liquid delivery hose has a liquid inlet and a liquid outlet. The elongate flexible liquid delivery hose is in fluid communication at the liquid inlet with the substantially hollow interior of the portable container for receiving liquid from the portable container, and in fluid communication at the liquid outlet with the at least one selected remote destination for delivering the received liquid to the at least one selected remote destination. An elongate flexible vapor recovery hose has a vapor inlet and a vapor outlet. The elongate flexible vapor recovery hose is in fluid communication at the vapor inlet with the at least one selected remote destination for receiving vapor from the at least one selected remote destination, and in fluid communication at the vapor outlet with the substantially hollow interior of the portable container for delivering the received vapor to the substantially hollow interior of the portable container. The elongate flexible liquid delivery hose and the elongate flexible vapor recovery hose permit the movement of the liquid outlet of the elongate flexible liquid delivery hose to the at least one selected remote destination while the container remains substantially stationary, to thereby permit the delivery of the liquid to the at least one selected remote destination. Reduced air pressure in the substantially hollow interior of the portable container resulting from the removal of the liquid from the substantially hollow interior of the portable container causes vapor to be suctioned via the elongate flexible vapor recovery hose into the substantially hollow interior of the portable container. In accordance with another aspect of the present invention there is disclosed a novel liquid delivery system for supplying liquid from a portable container to at least one selected remote destination and removing vapor from the at least one selected remote destination. The liquid delivery system comprises a portable container having a substantially hollow interior for retaining liquid therein. There is a pump means operatively connected to the portable container for causing the liquid therein to be pumped from the portable container to the at least one selected remote destination when the pump means is pumped. An elongate flexible liquid delivery hose has a liquid inlet and a liquid outlet. The elongate flexible liquid delivery hose is in fluid communication at the liquid inlet with the pump means for receiving liquid from the pump means, and in fluid communication at the liquid outlet with the at least one selected remote destination for delivering the received liquid to the at least one selected remote destination. An elongate flexible vapor recovery hose has a vapor inlet and a vapor outlet. The elongate flexible vapor recovery hose is in fluid communication at the vapor inlet with the at least one selected remote destination for receiving vapor from the at least one selected remote destination, and being in fluid communication at the vapor outlet with the substantially hollow interior of the portable container for delivering the received vapor to the substantially hollow interior of the portable container. The elongate flexible liquid delivery hose and the elongate flexible vapor recovery hose permit the movement of the liquid outlet of the elongate flexible liquid delivery hose to the at least one selected remote destination while the container remains substantially stationary, to thereby permit the delivery of the liquid to the at least one selected remote destination. Reduced air pressure in the substantially hollow interior of the portable container resulting from the removal of the liquid from the substantially hollow interior of the portable container causes vapor to be suctioned via the elongate flexible vapor recovery hose into the substantially hollow interior of the portable container.

In accordance with yet another aspect of the present invention there is disclosed a novel method of supplying liquid from a portable container to at least one selected remote destination and removing vapor from the at least one selected remote destination. The method comprising the steps of supplying liquid to a remote destination via an elongate flexible liquid delivery hose that is in fluid communication with a portable container; and suctioning vapor from the remote destination to the portable container through an elongate flexible vapor recovery hose in fluid communication with the portable container, wherein low air pressure in the portable container, as caused by the removal of liquid from the portable container, causes the suctioning of the vapor.

In accordance with yet another aspect of the present invention there is disclosed a novel hose assembly for supplying liquid from a portable container to at least one selected remote destination and removing vapor from the at least one selected remote destination. The hose assembly comprises an elongate flexible liquid delivery hose having a liquid inlet and a liquid outlet, and is operatively connectable at the liquid inlet to be in fluid communication with the interior of a portable container, for supplying liquid from the portable container to the remote destination. An elongate flexible vapor recovery hose has a vapor inlet and a vapor outlet, and is operatively connectable at the vapor outlet to be in fluid communication with the interior of a portable container, for permitting the flow of vapor from at least one remote destination to the portable container.

In accordance with yet another aspect of the present invention there is disclosed a novel two-channel spout for use with a liquid delivery system for supplying liquid from a portable container to at least one selected remote destination and removing vapor from the at least one selected remote destination. The two-channel spout comprises a main body, a liquid flow channel within the main body, and a vapor flow channel within the main body. The liquid flow channel and the vapor flow channel are separate and distinct one from the other.

In accordance with yet another aspect of the present invention there is disclosed a novel adaptable nozzle for use with a liquid delivery system for supplying liquid from a portable container to at least one selected remote destination and removing vapor from the at least one selected remote destination. The adaptable nozzle comprises a two-channel spout coupler having an interior end and an exterior end, for removable and replaceable attachment of a two-channel spout. There is a nozzle body for housing portions of the two-channel spout coupler, an elongate flexible liquid delivery hose, and an elongate flexible vapor recovery hose. The elongate flexible liquid delivery hose and the elongate flexible vapor recovery hose are each operatively connectable in fluid communication to the two-channel spout coupler at the interior end.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the liquid delivery system according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings:

FIG. 16A is a cut-away side elevational view of a second preferred embodiment nozzle body assembly according to the present invention;

FIG. 16B is a cut-away side elevational view of the third preferred embodiment two-channel spout coupler of the nozzle body assembly of FIG. 16A;

FIG. 16C is a cut-away side elevational view of the fourth preferred embodiment two-channel spout coupler according to the present invention;

DETAILED DESCRIPTION OF THE PREFERRED AND ALTERNATIVE EMBODIMENTS

Figure 1A:
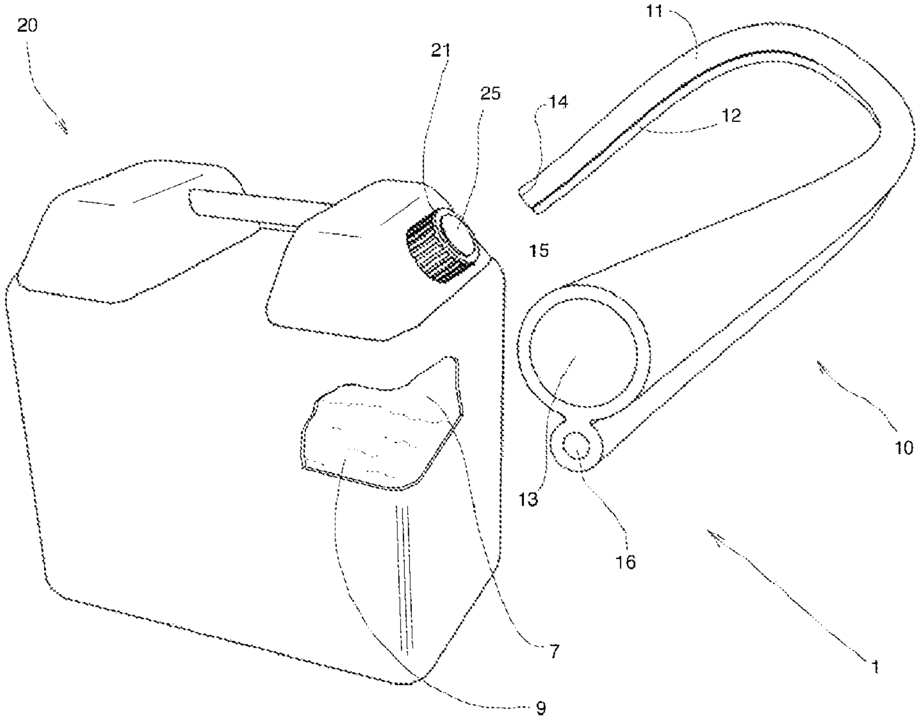
FIG. 1A is a perspective view of the first preferred embodiment of the liquid delivery system according to the present invention, with the integrally formed elongate flexible liquid delivery hose and elongate flexible vapor recovery hose shown disconnected from the portable container.
Figure 1B:
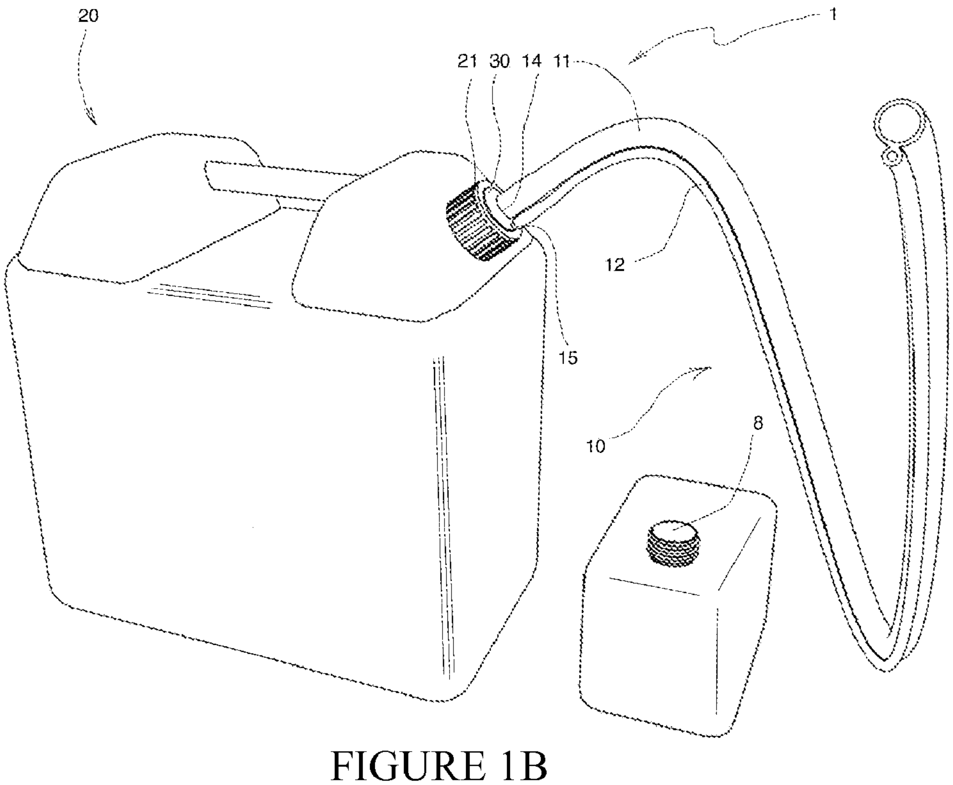
FIG. 1B is a perspective view similar to FIG. 1A, but with the integrally formed elongate flexible liquid delivery hose and elongate flexible vapor recovery hose shown connected to the portable container.
Figure 1C:
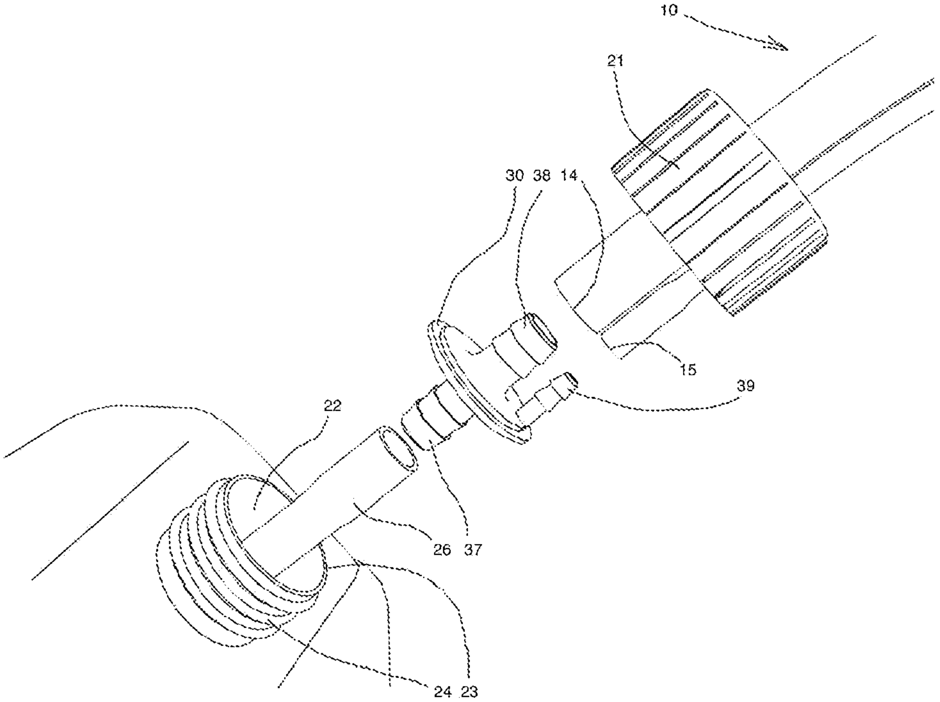
FIG. 1C is an enlarged exploded perspective view of the portion of the first preferred embodiment liquid delivery system according to the present invention.
Figure 1D:
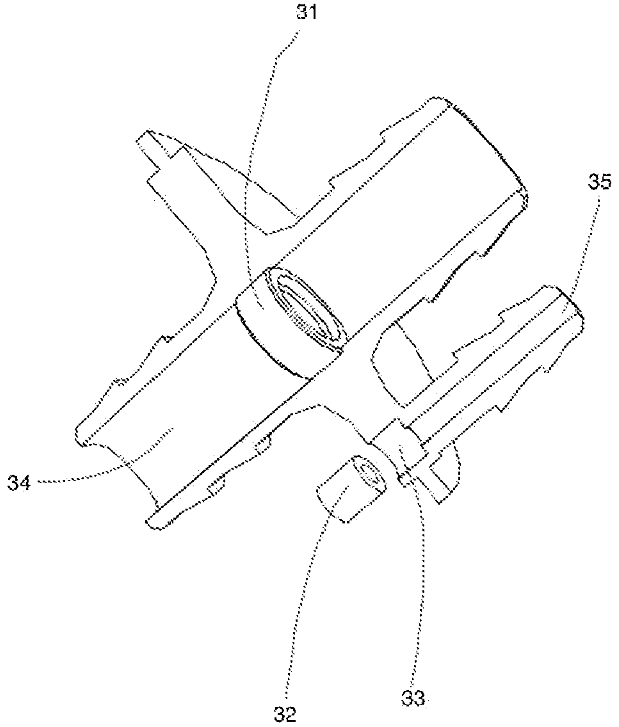
FIG. 1D is a greatly enlarged perspective view of the container coupling means of FIG. 2B.
Figure 1E:
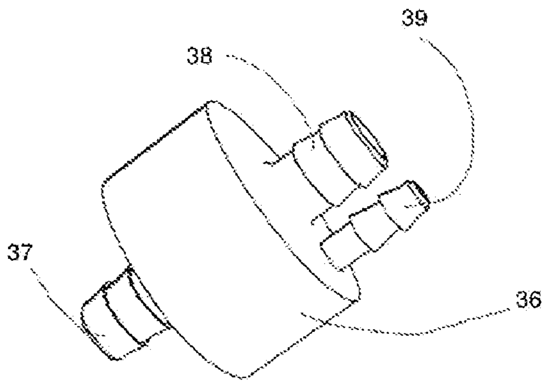
FIG. 1E is a greatly enlarged perspective view of an alternative embodiment container coupling means.
Figure 2A:
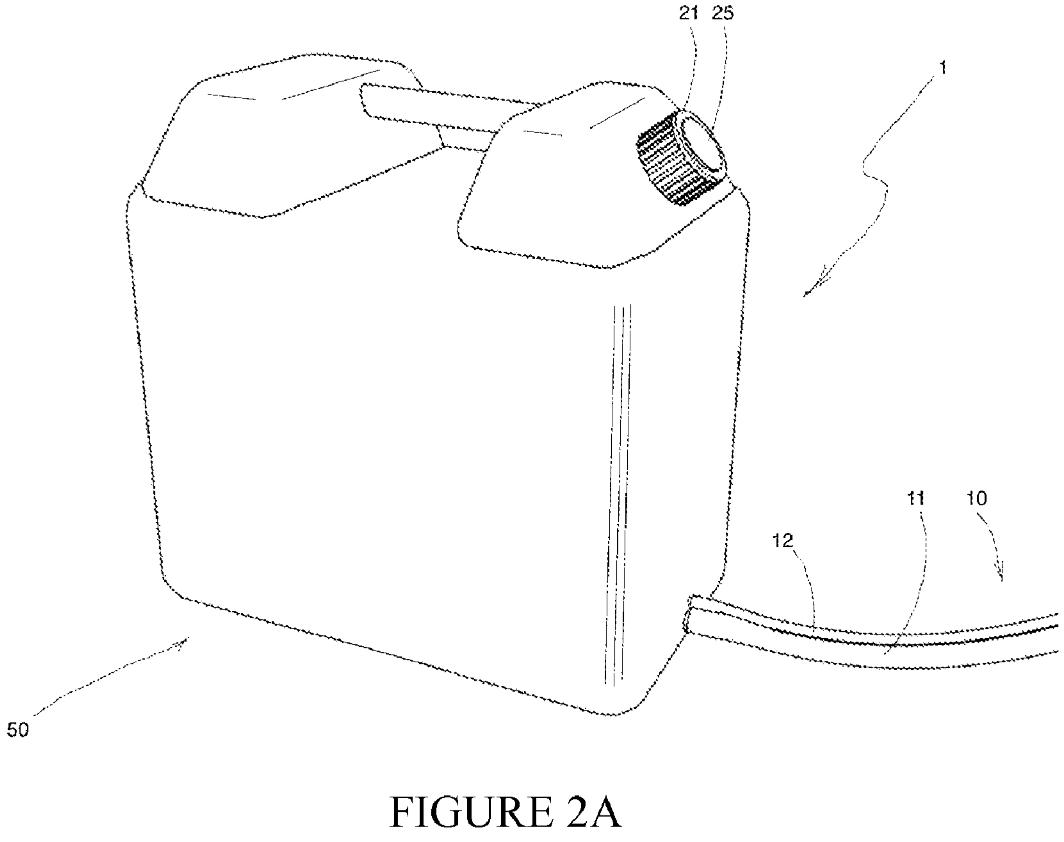
FIG. 2A is a perspective view of the first alternative embodiment of the liquid delivery system according to the present invention, with the integrally formed elongate flexible liquid delivery hose and elongate flexible vapor recovery hose shown connected to the portable container.
Figure 2B:
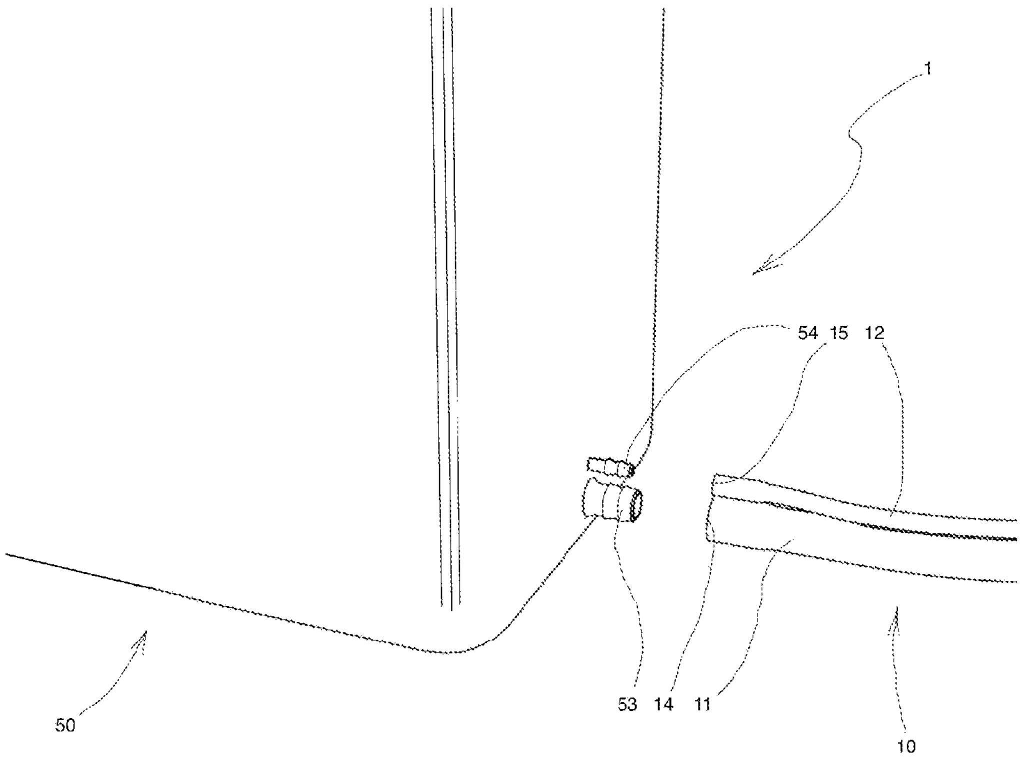
FIG. 2B is an enlarged perspective view of the first alternative embodiment of the liquid delivery system of FIG. 2A, but with the integrally formed elongate flexible liquid delivery hose and elongate flexible vapor recovery hose shown disconnected from the portable container.
Figure 3:
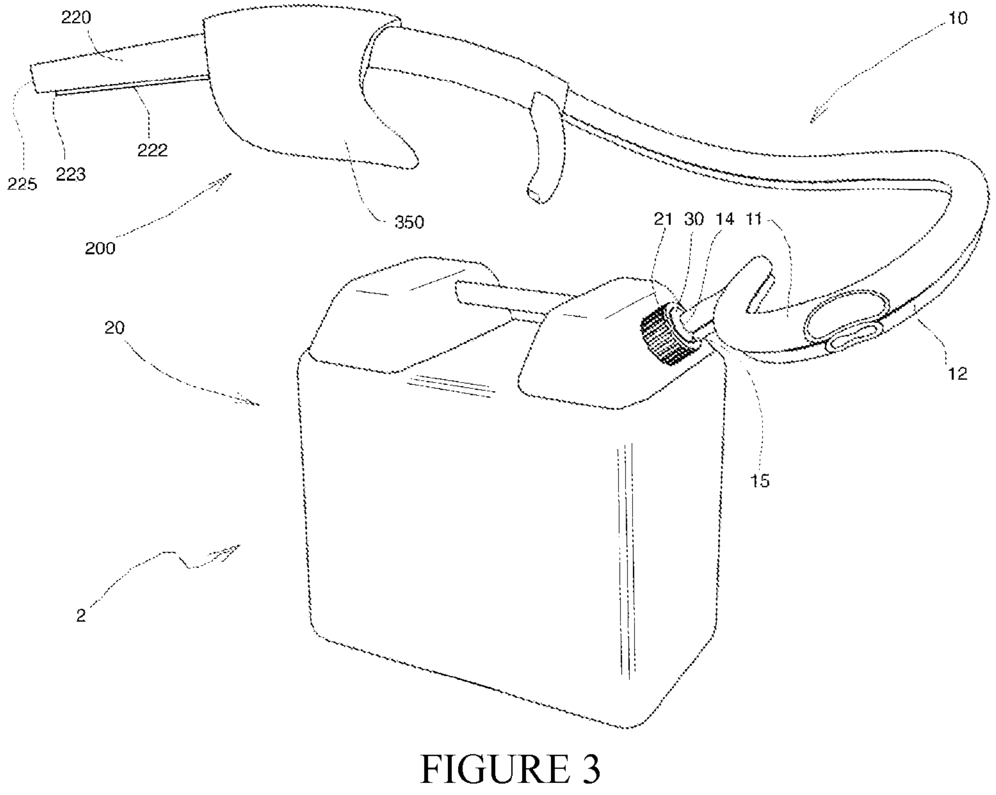
FIG. 3 is a perspective view of the second preferred embodiment of the liquid delivery system according to the present invention, with the integrally formed elongate flexible liquid delivery hose and elongate flexible vapor recovery hose shown connected to the portable container.
Figure 4:
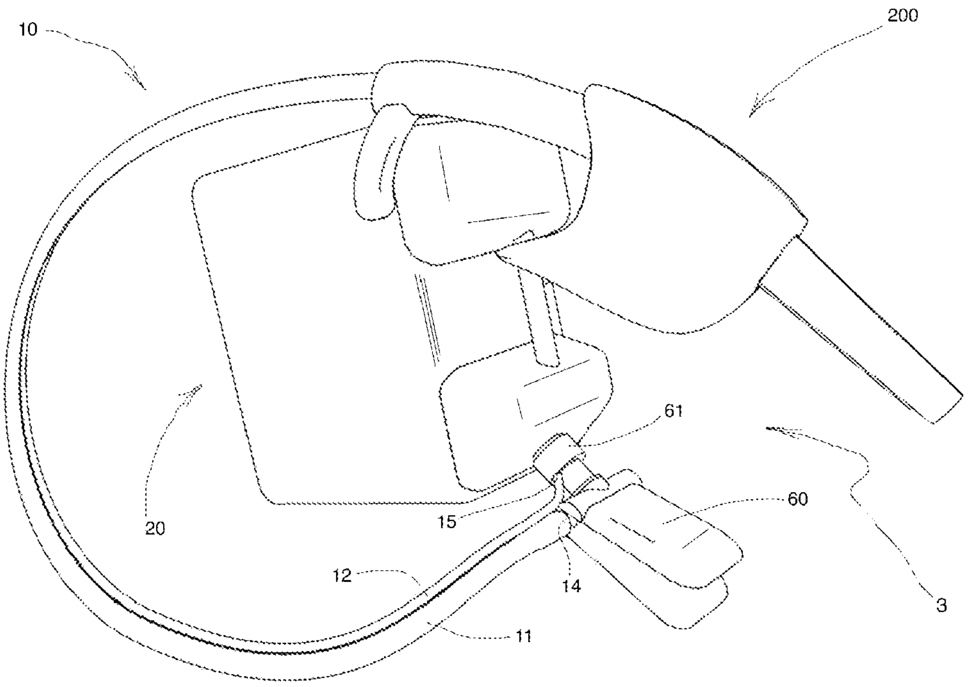
FIG. 4 is a perspective view of the third preferred embodiment of the liquid delivery system according to the present invention.
Figure 5A:
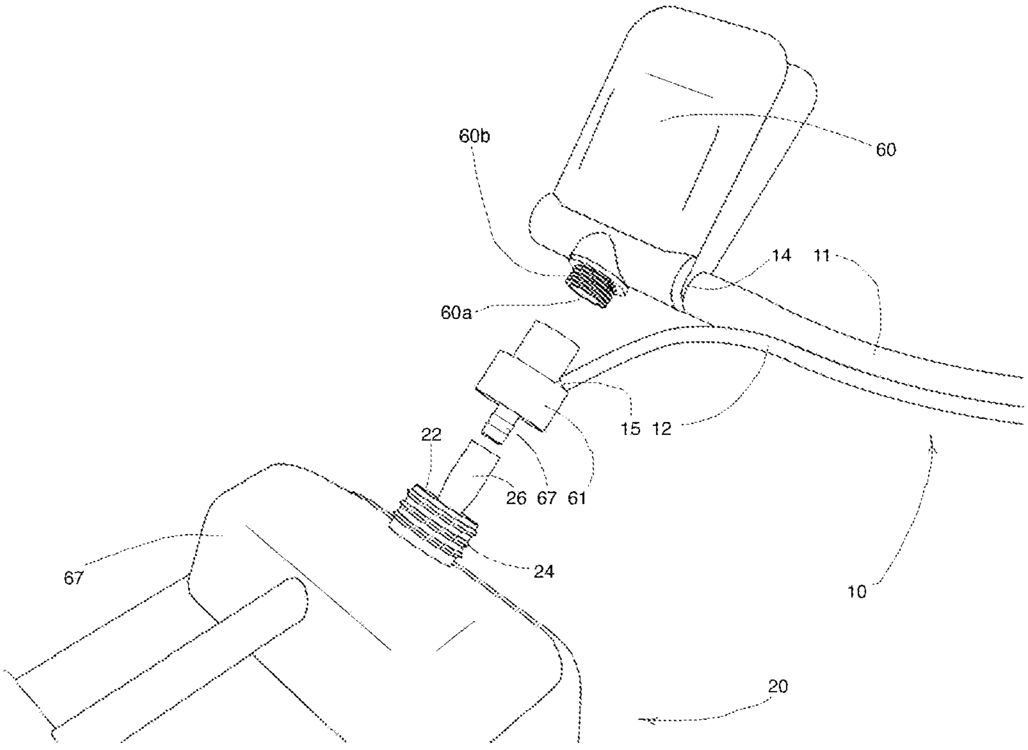
FIG. 5A is an enlarged exploded perspective view of an upper portion of the third preferred embodiment of the liquid delivery system of FIG. 4.
Figure 5B:
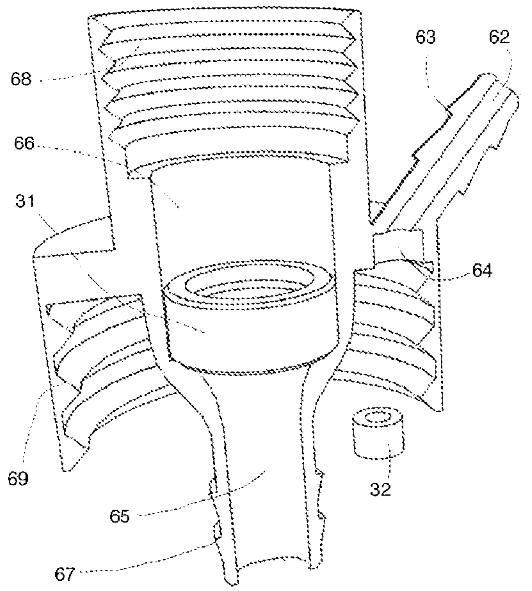
FIG. 5B is a greatly enlarged exploded perspective view of the container coupling means of the third preferred embodiment of the liquid delivery system of FIG. 4.
Figure 6A:
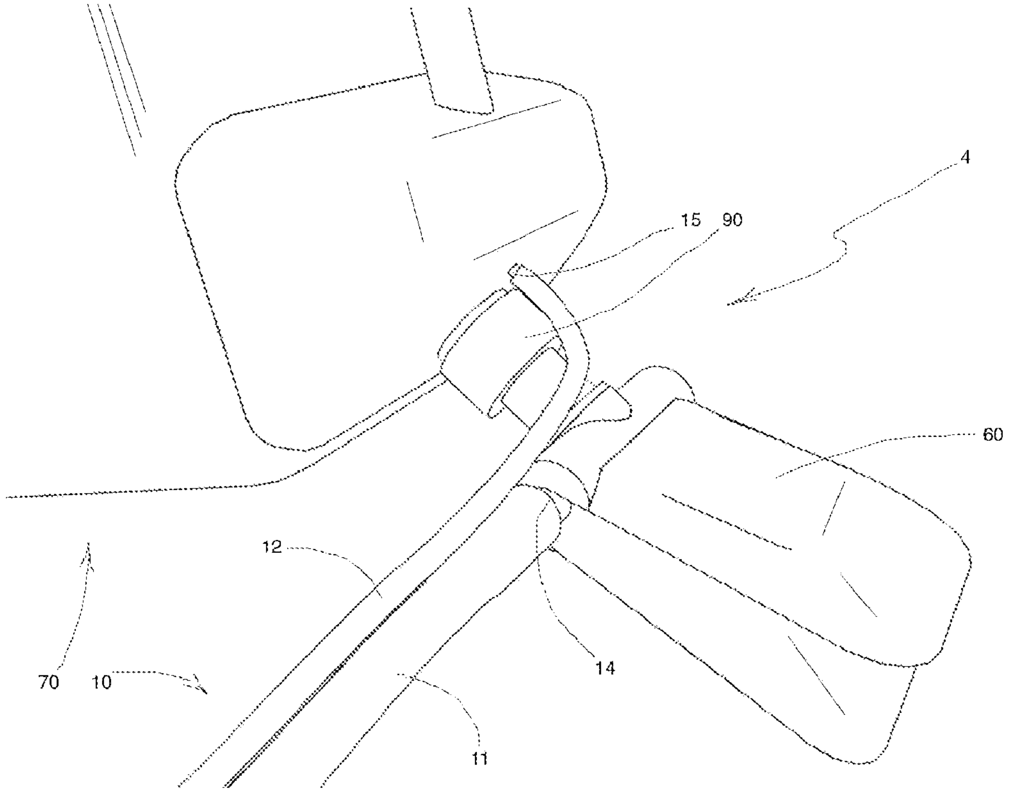
FIG. 6A is a perspective view of the fourth preferred embodiment of the liquid delivery system according to the present invention.
Figure 6B:
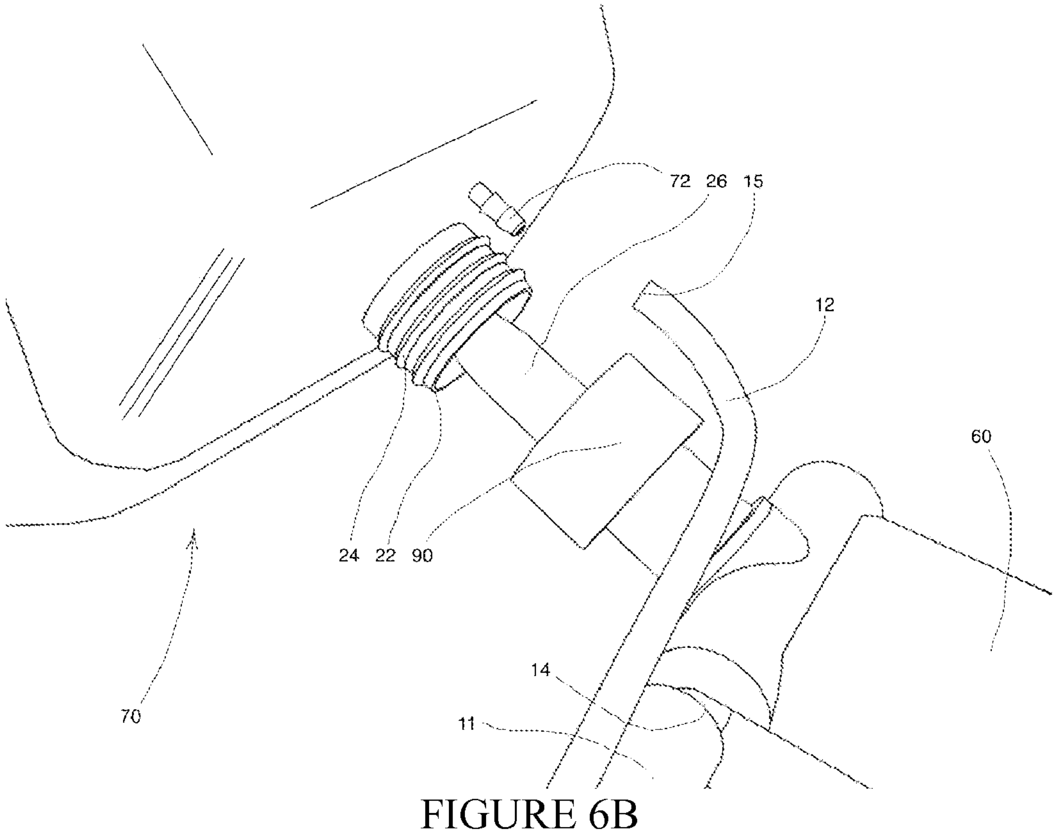
FIG. 6B is an exploded perspective view of an upper portion of the fourth preferred embodiment of the liquid delivery system of FIG. 6A.
Figure 7A:
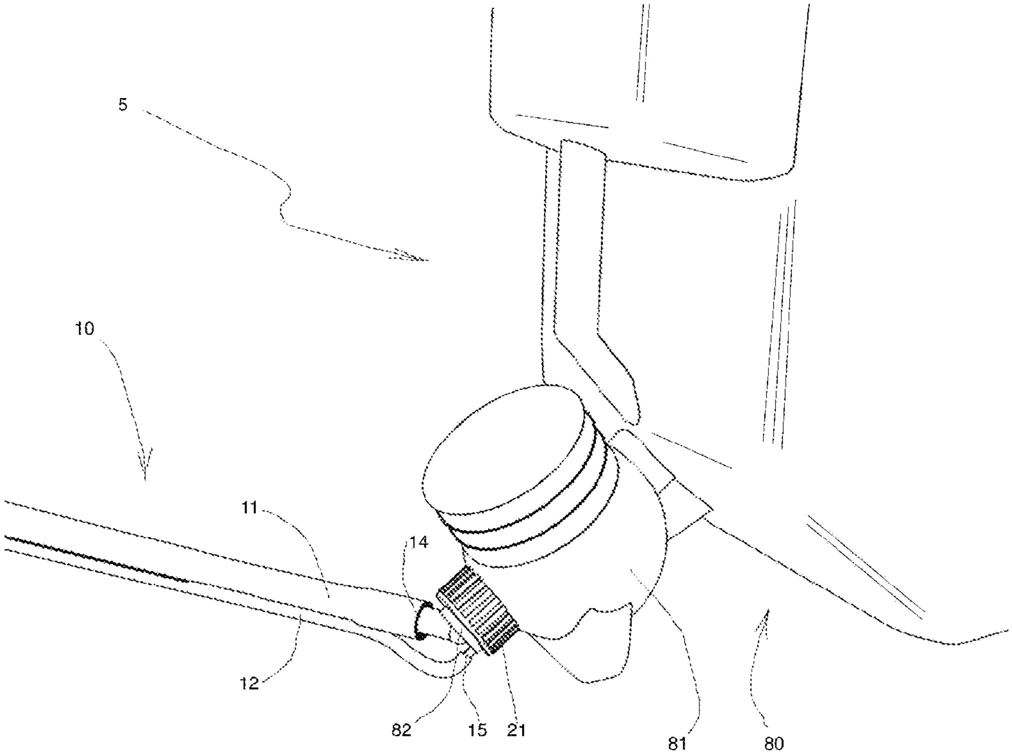
FIG. 7A is a perspective view of the fifth preferred embodiment of the liquid delivery system according to the present invention.
Figure 7B:
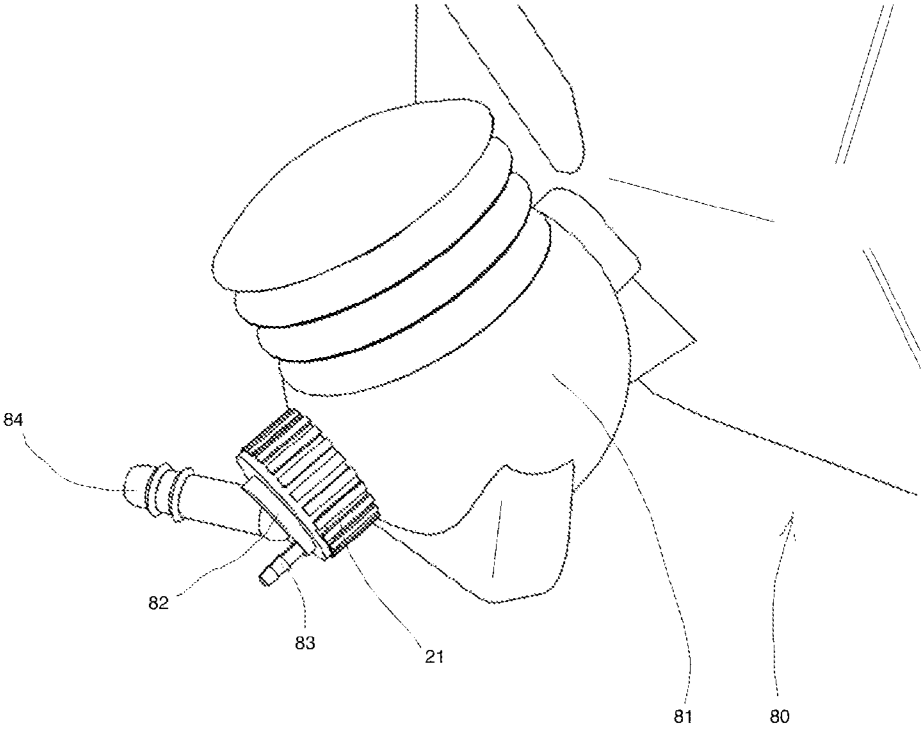
FIG. 7B is an enlarged perspective view of a lower portion of the fifth preferred embodiment of the liquid delivery system of FIG. 7A.
Figure 8A:
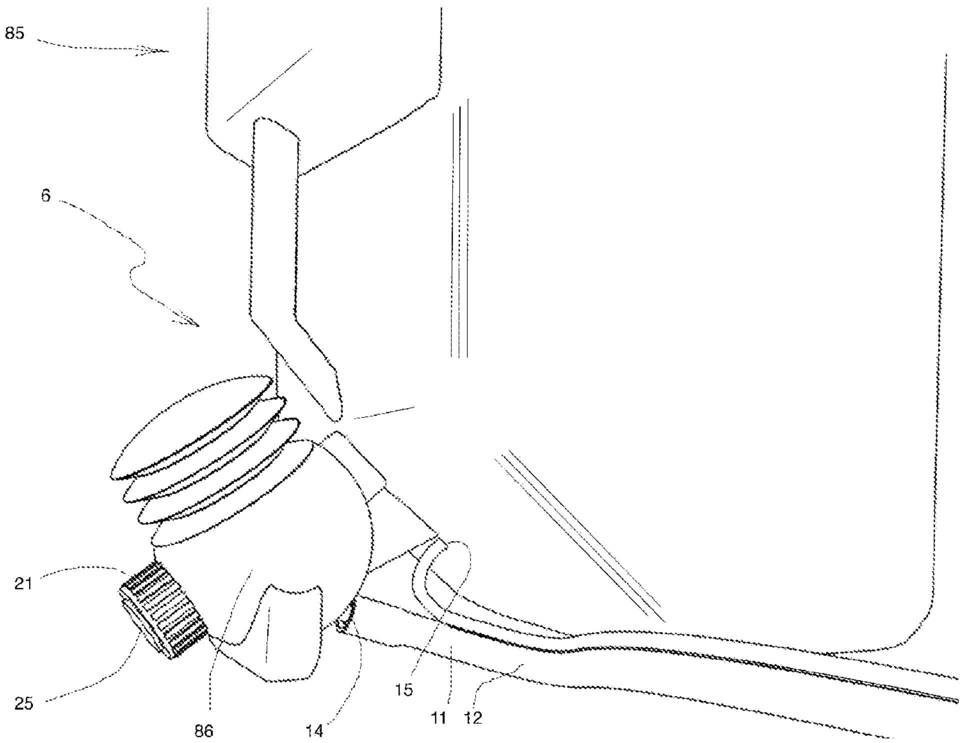
FIG. 8A is a perspective view of the sixth preferred embodiment of the liquid delivery system according to the present invention.
Figure 8B:
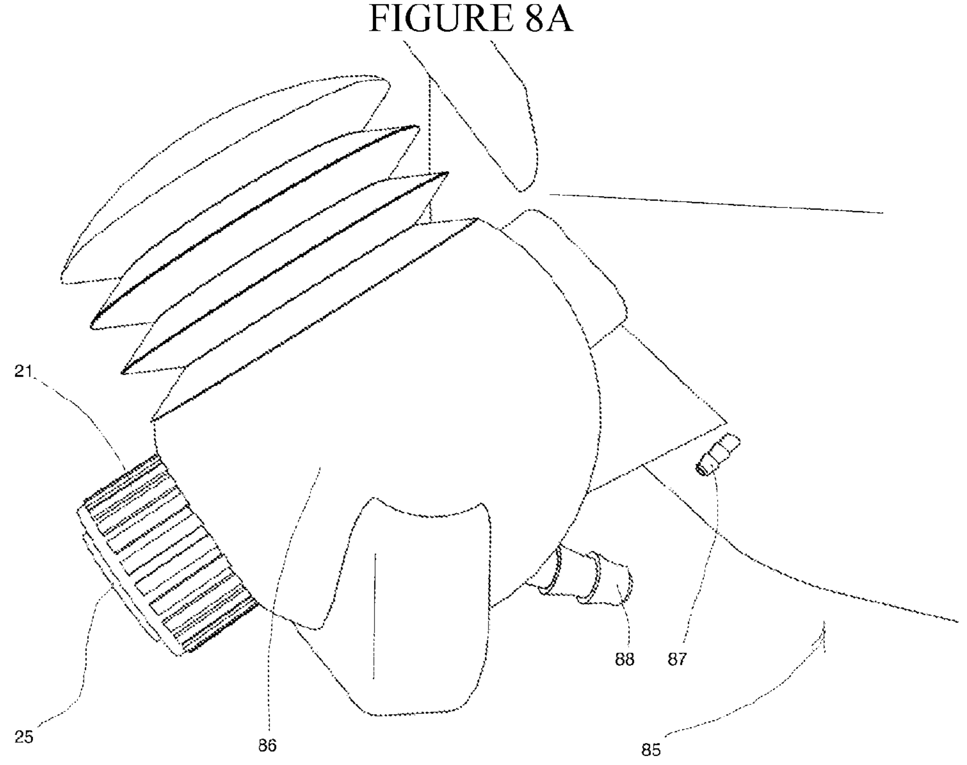
FIG. 8B is an enlarged perspective view of a lower portion of the sixth preferred embodiment of the liquid delivery system of FIG. 8A.
Figure 9A:
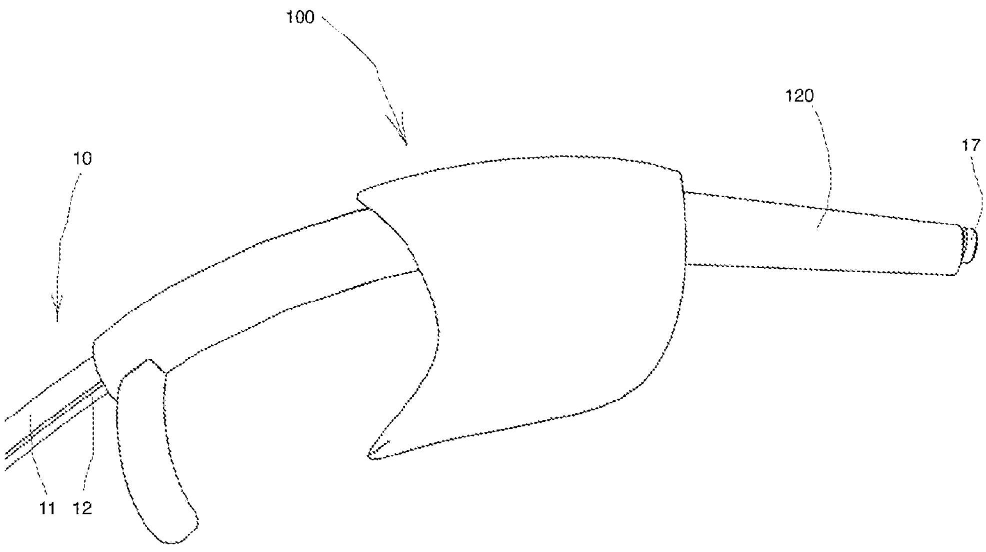
FIG. 9A is a side elevational view of the first preferred embodiment nozzle-and-spout assembly as seen in the third preferred embodiment of the liquid delivery system of FIG. 4, with a first preferred embodiment spout.
Figure 9B:
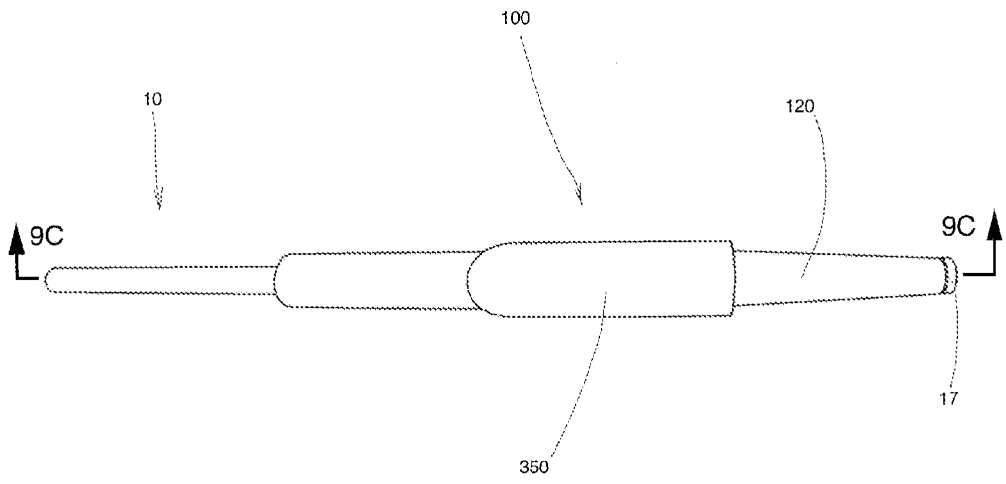
FIG. 9B is a top plan view of the nozzle-and-spout assembly of FIG. 9A.
Figure 9C:
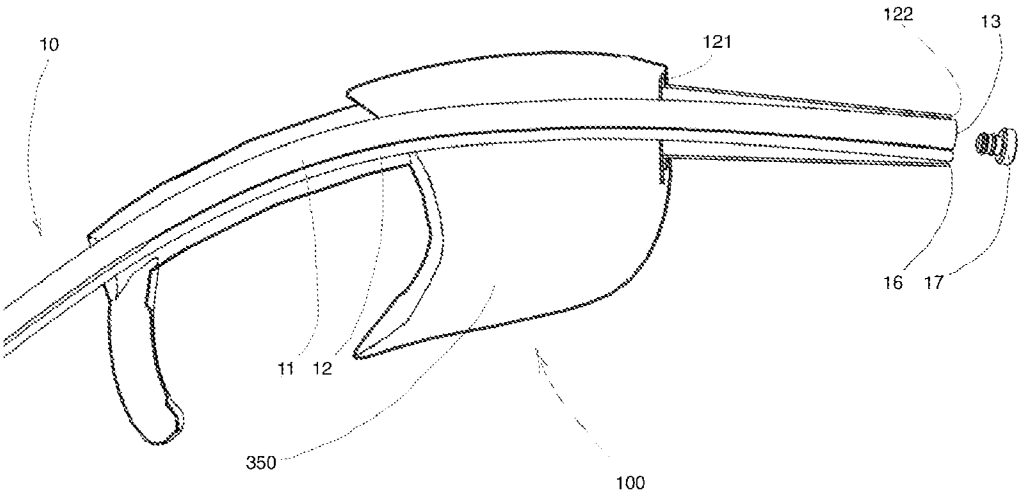
FIG. 9C is a sectional side elevational view of the nozzle-and-spout assembly of FIG. 9B, taken along section line 9C-9C of FIG. 9B.
Figure 10A:
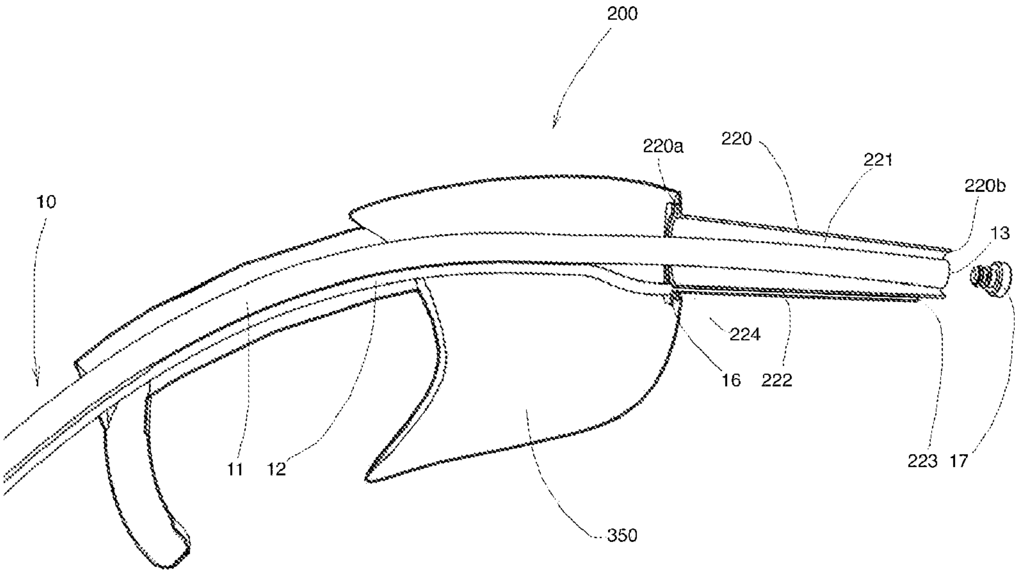
FIG. 10A is a cut-away side elevational view of a second preferred embodiment nozzle-and-spout assembly according to the present invention, with the second preferred embodiment spout attached.
Figure 10B:
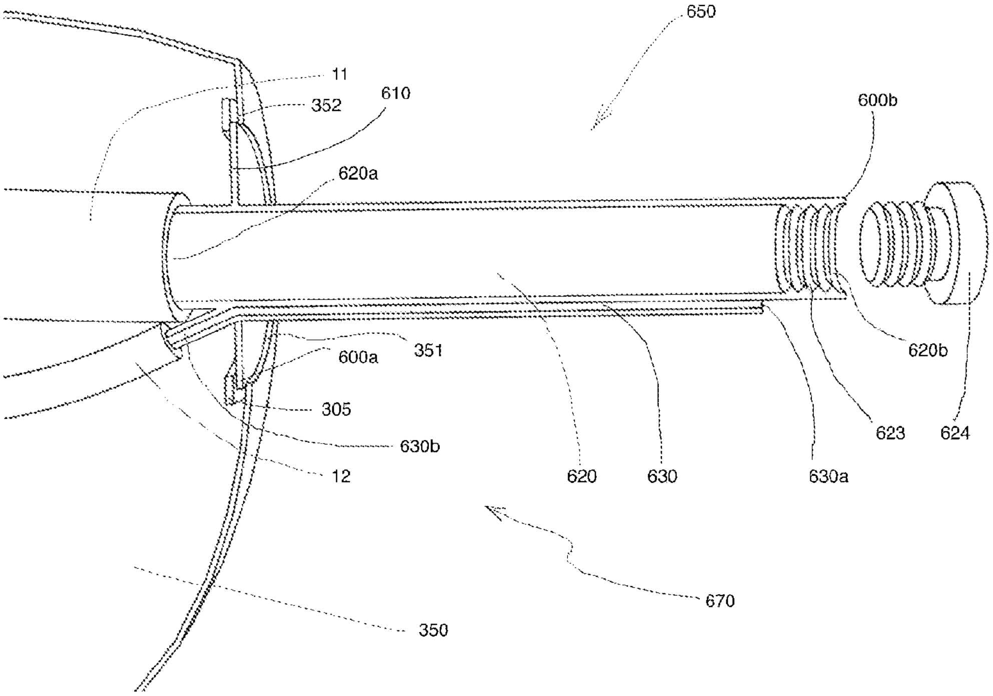
FIG. 10B is a cut-away side elevational view of a third preferred embodiment nozzle-and-spout assembly according to the present invention, with the third preferred embodiment spout attached.
Figure 11A:
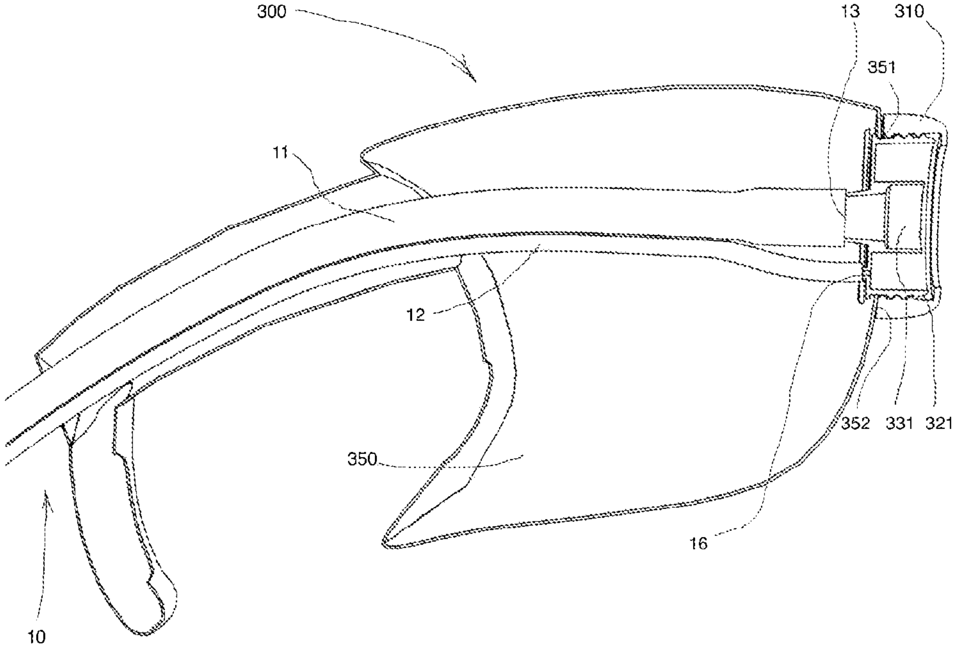
FIG. 11A is a cut-away side elevational view of a first preferred embodiment nozzle body assembly according to the present invention, without a spout attached.
Figure 11C:
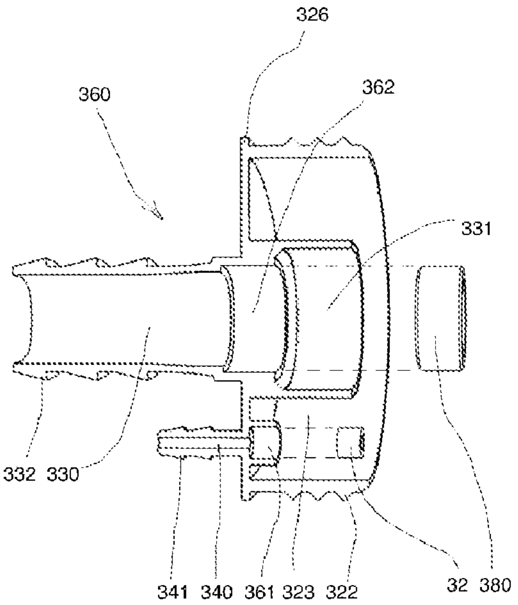
FIG. 11C is a cut-away side elevational view of the second preferred embodiment two-channel spout coupler according to the present invention.
Figure 11B:
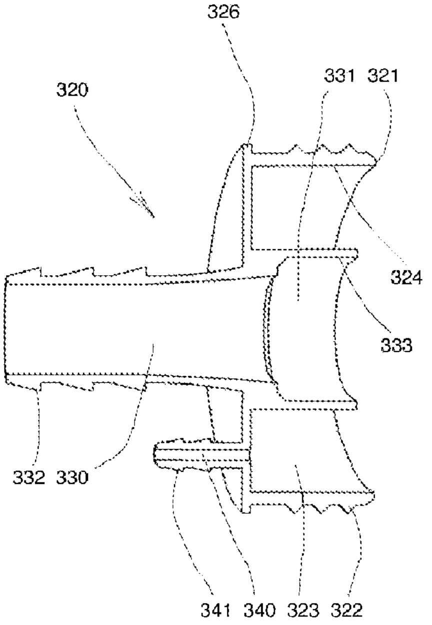
FIG. 11B is a cut-away side elevational view of the first preferred embodiment two-channel spout coupler of the nozzle body assembly of FIG. 11A.
Figure 12A:
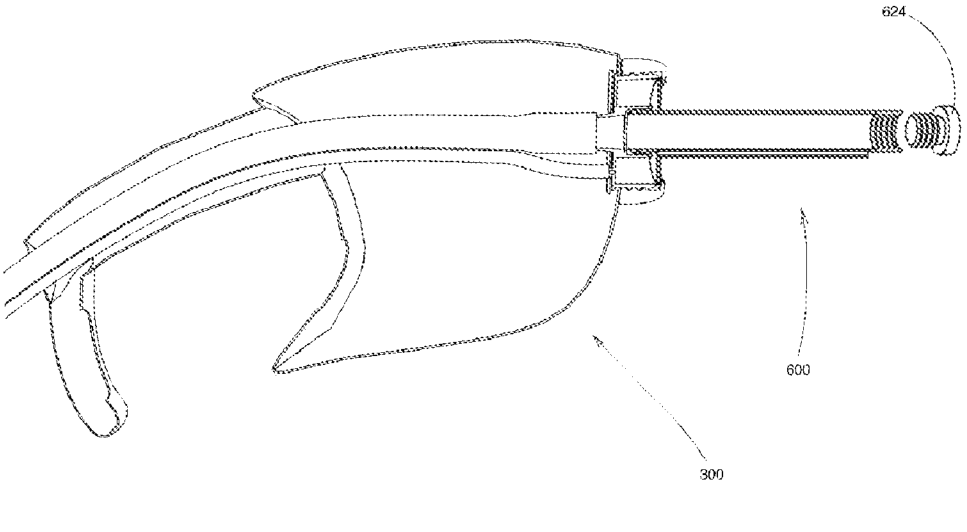
FIG. 12A is a cut-away side elevational view similar to FIG. 11A, showing the fourth preferred embodiment nozzle-and-spout assembly with first preferred embodiment nozzle body assembly and fourth preferred embodiment spout attached.
Figure 12B:
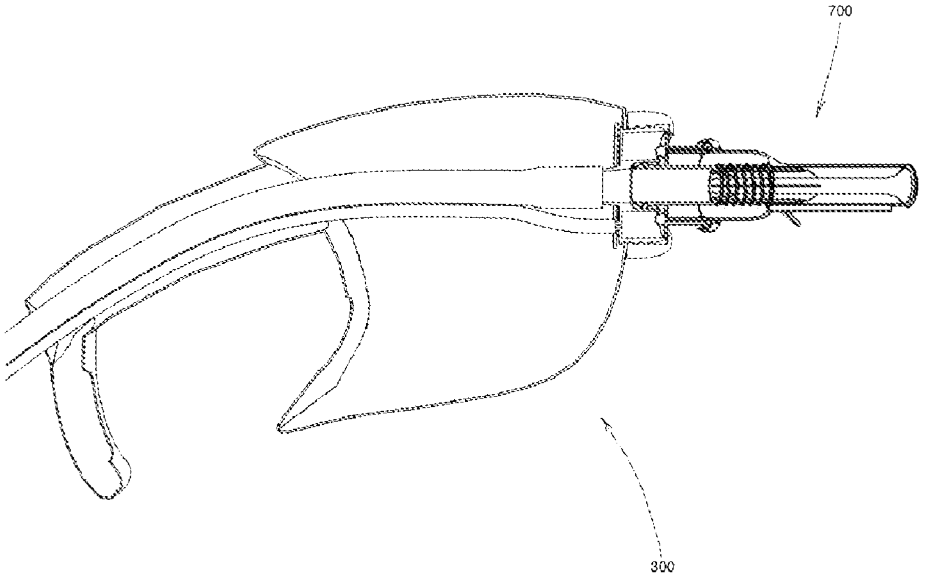
FIG. 12B is a cut-away side elevational view similar to FIG. 11A, but showing the fifth preferred embodiment nozzle-and-spout assembly with first preferred embodiment nozzle body assembly and fifth preferred embodiment spout according to the present invention.
Figure 12C:
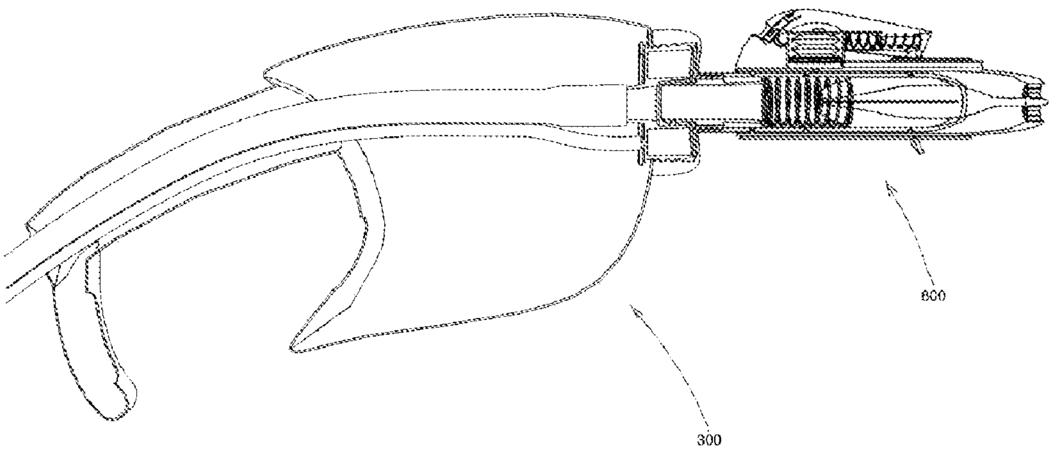
FIG. 12C is a cut-away side elevational view similar to FIG. 11A, but showing the sixth preferred embodiment nozzle-and-spout assembly with first preferred embodiment nozzle body assembly and sixth preferred embodiment spout according to the present invention.
Figure 13:
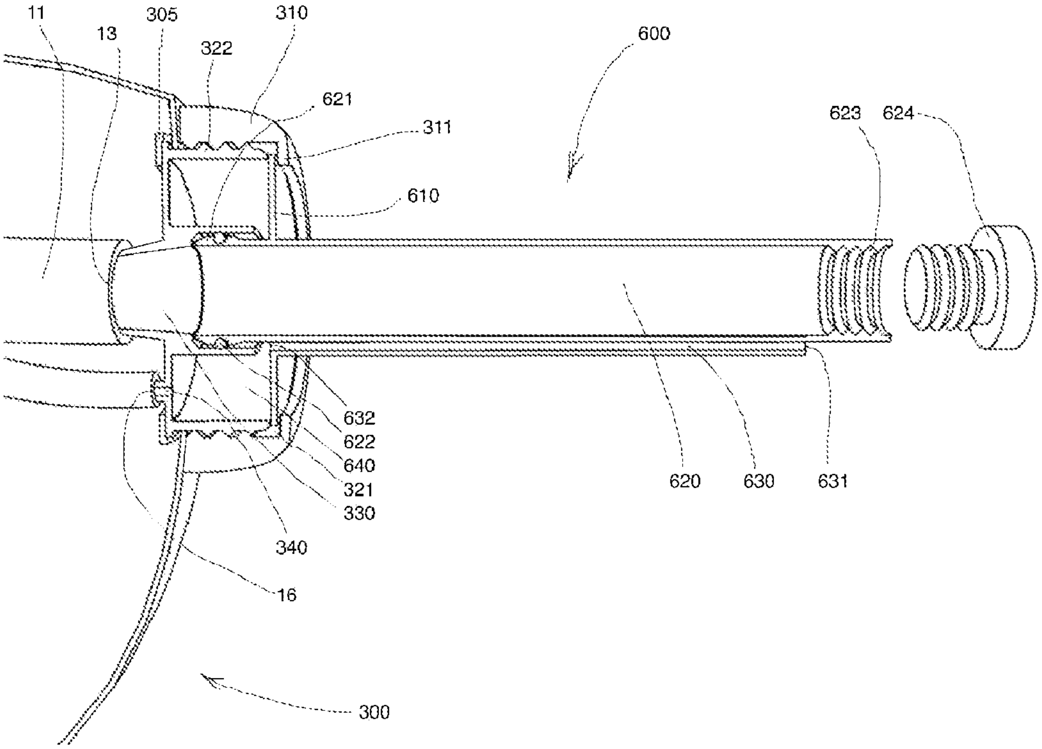
FIG. 13 is an enlarged cut-away side elevational view of a portion of the fourth preferred embodiment nozzle-and-spout assembly of FIG. 12A with first preferred embodiment nozzle body assembly and fourth preferred embodiment spout.
Figure 14A:
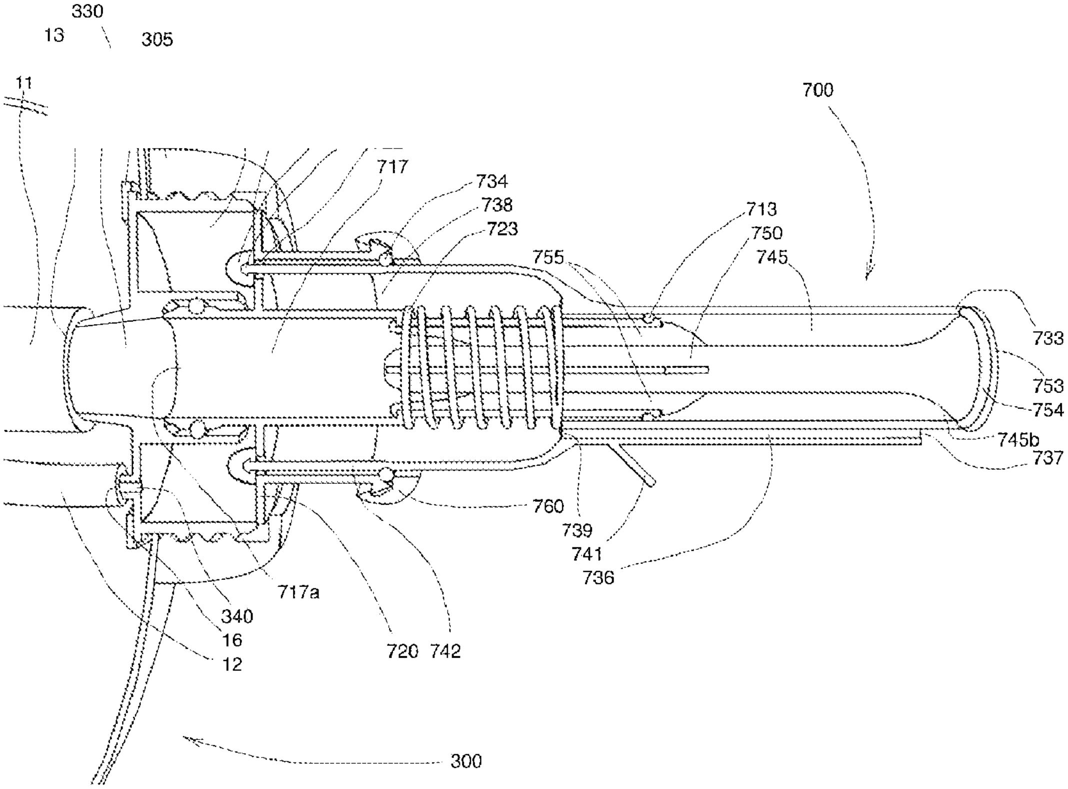
FIG. 14A is an enlarged cut-away side elevational view of a portion of the fifth preferred embodiment spout-and-nozzle nozzle-and-spout assembly of FIG. 12B with first preferred embodiment nozzle body assembly and fifth preferred embodiment spout.
Figure 14B:
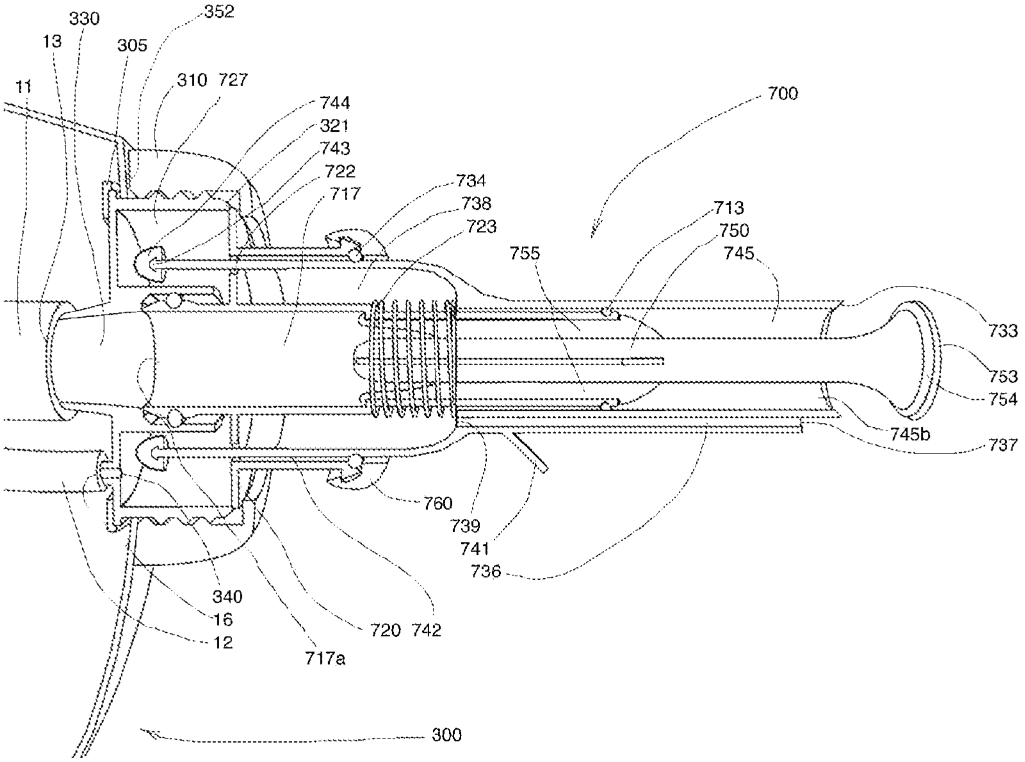
FIG. 14B is an enlarged cut-away side elevational view similar to FIG. 14A, but with an automatic closure mechanism in an open configuration.
Figure 15A:
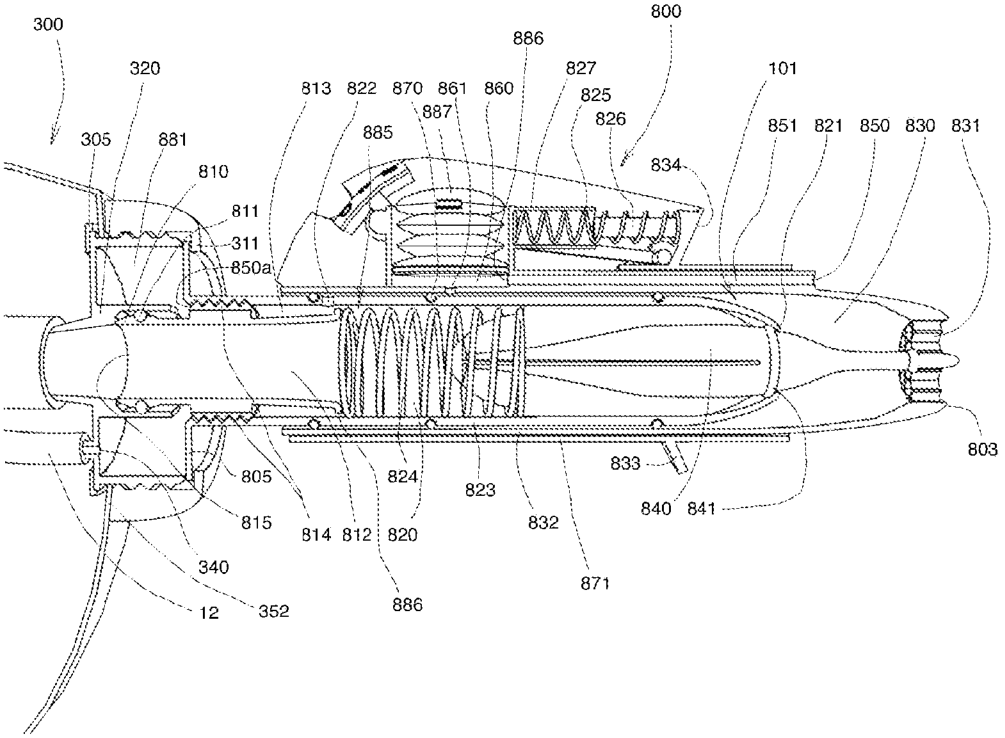
FIG. 15A is an enlarged cut-away side elevational view of a portion of the sixth preferred embodiment nozzle-and-spout assembly of FIG. 12C with first preferred embodiment nozzle body assembly and sixth preferred embodiment spout.
Figure 15B:
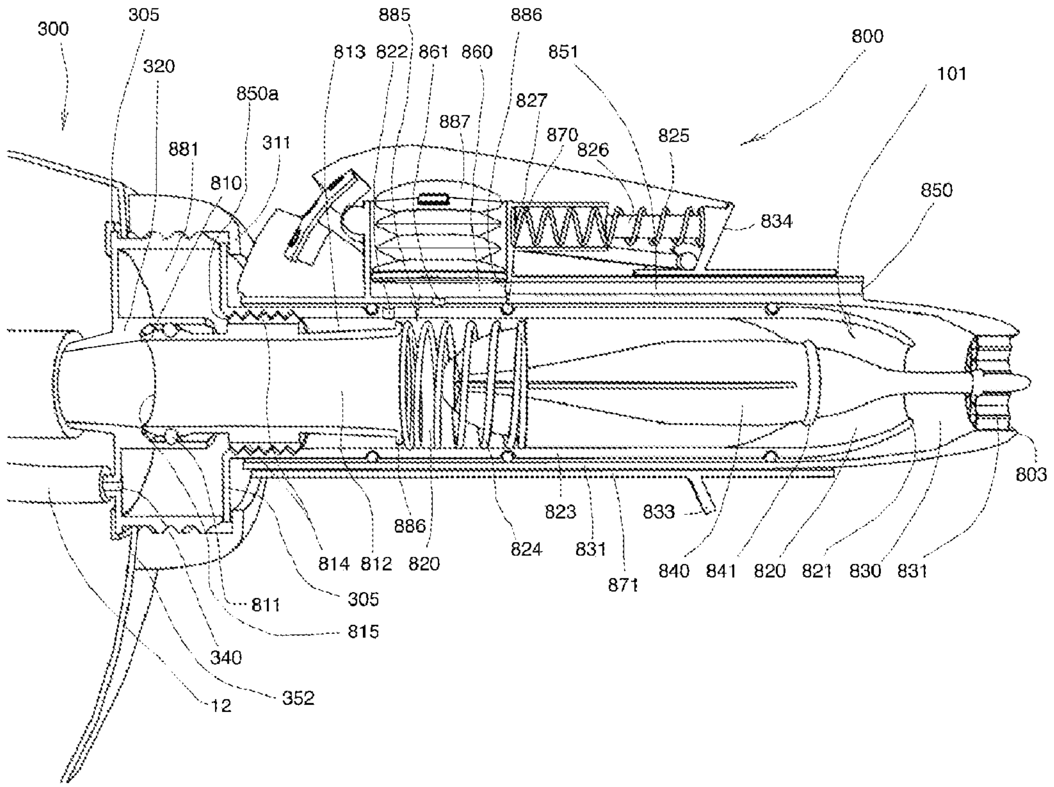
FIG. 15B is a cut-away side elevational view similar to FIG. 15A, but with an automatic closure mechanism in an open configuration.
Figure 15C:
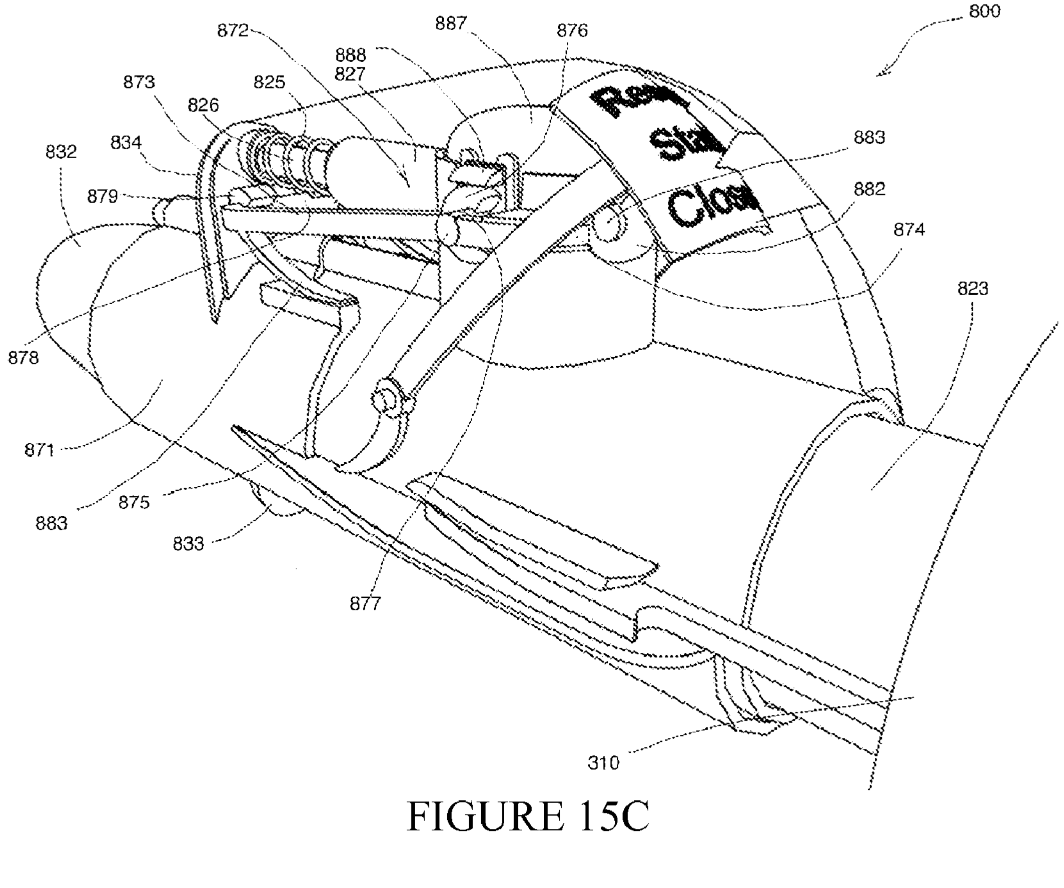
FIGS. 15C and 15D are another cut-away view of the nozzle-and-spout assembly of FIG. 15A, in an enabled configuration.
Figure 15D:
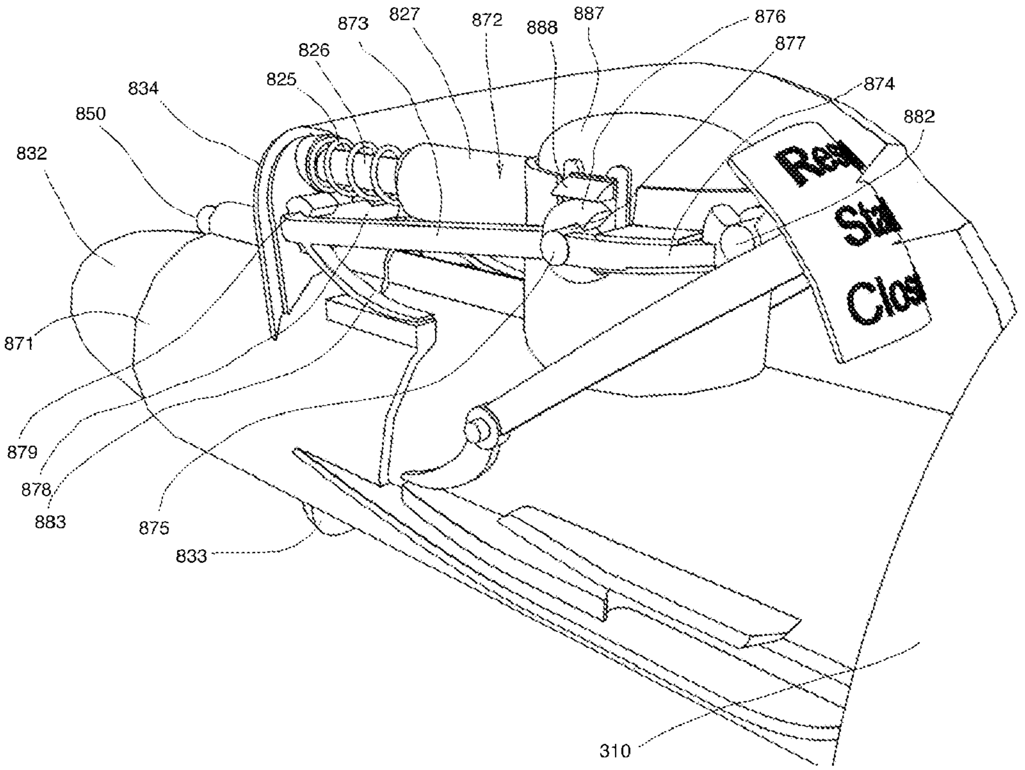
Figure 17A:
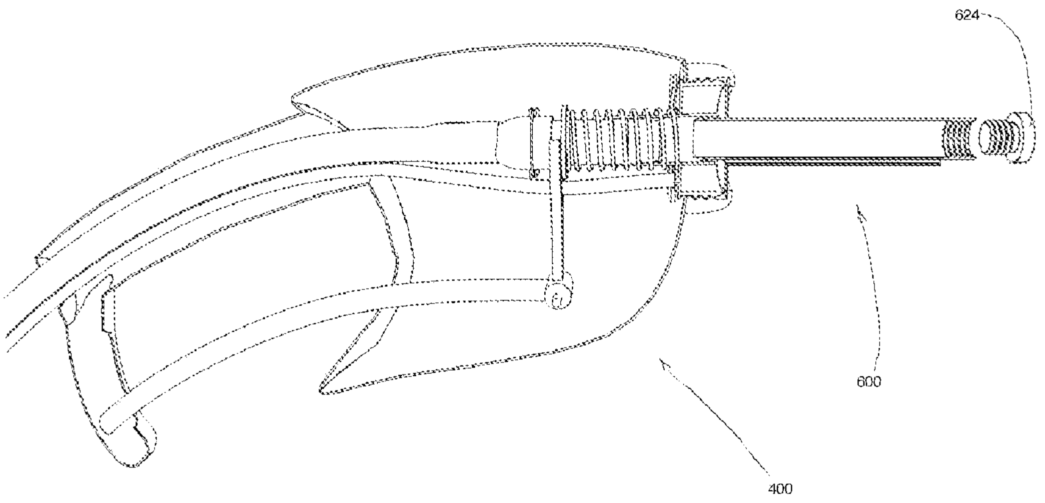
FIG. 17A is a cut-away side elevational view similar to FIG. 16A, showing the fourth preferred embodiment nozzle-and-spout assembly with second preferred embodiment nozzle body assembly and fourth preferred embodiment spout according to the present invention.
Figure 17B:
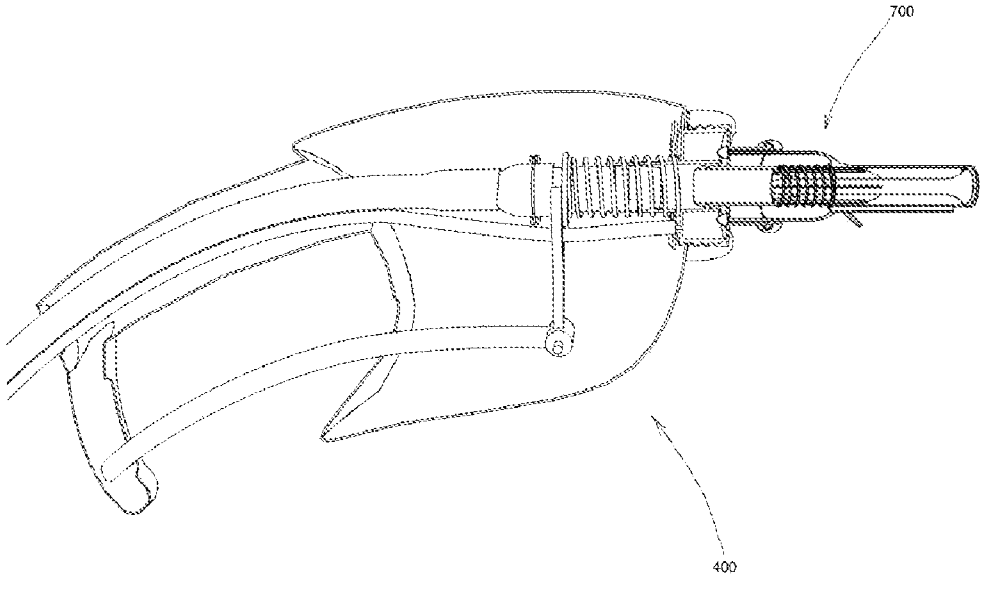
FIG. 17B is a cut-away side elevational view similar to FIG. 16A, showing the fifth preferred embodiment nozzle-and-spout assembly with second preferred embodiment nozzle body assembly and fifth preferred embodiment spout according to the present invention.
Figure 17C:
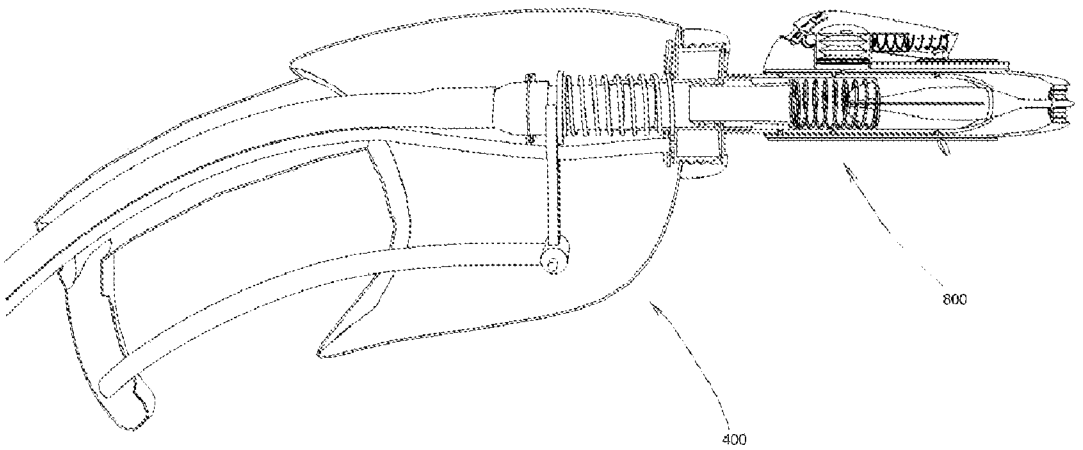
FIG. 17C is a cut-away side elevational view similar to FIG. 16A, showing a sixth preferred embodiment nozzle-and-spout assembly with second preferred embodiment nozzle body assembly and sixth preferred embodiment spout according to the present invention.
Figure 18:
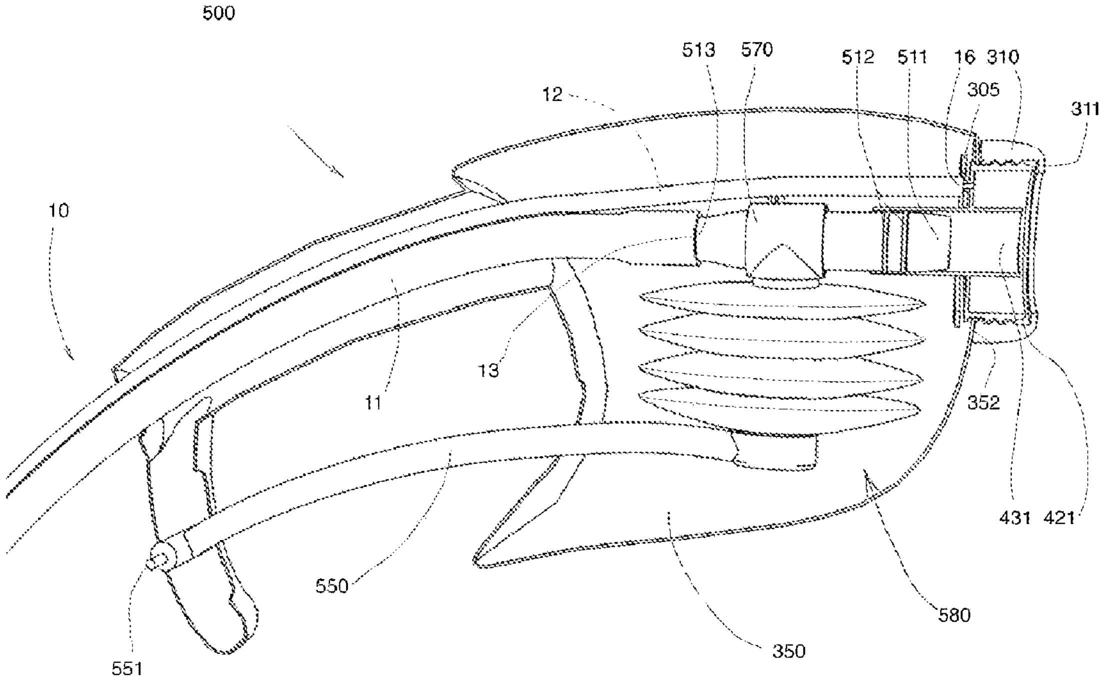
FIG. 18 is a cut-away side elevational view of a third preferred embodiment nozzle body assembly according to the present invention.
Figure 19A:
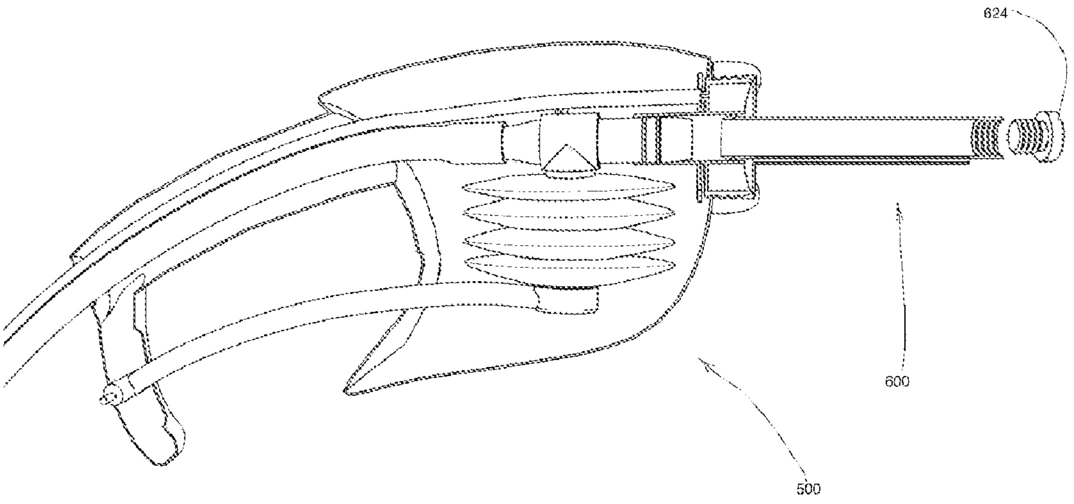
FIG. 19A is a cut-away side elevational view similar to FIG. 18, showing the fourth preferred embodiment nozzle-and-spout assembly with third preferred embodiment nozzle body assembly and fourth preferred embodiment spout according to the present invention.
Figure 19B:
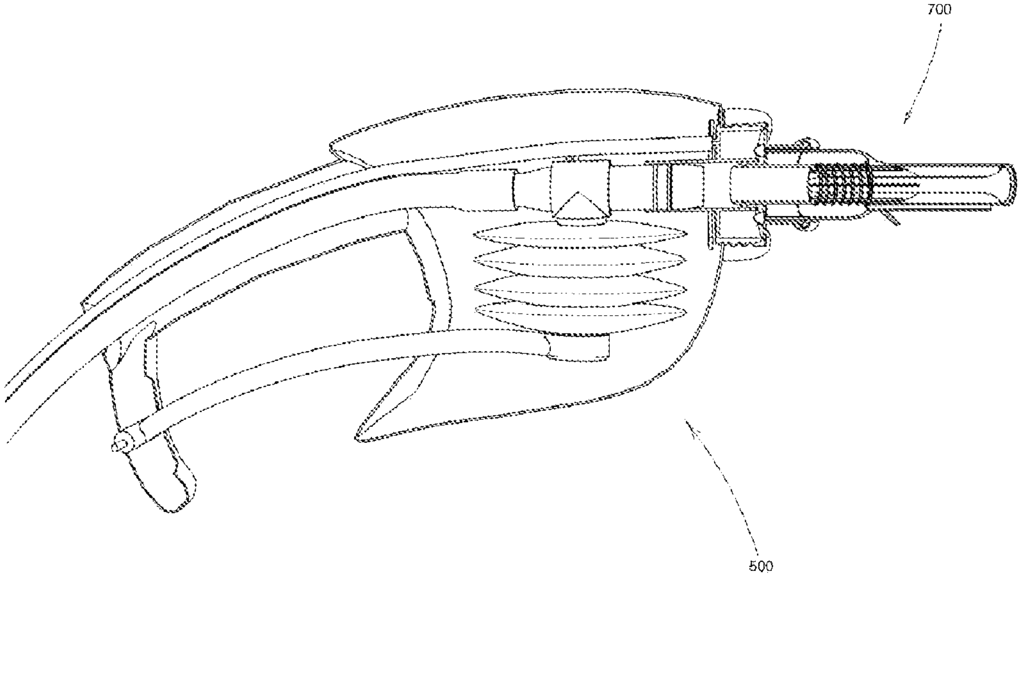
FIG. 19B is a cut-away side elevational view similar to FIG. 18, showing the fifth preferred embodiment nozzle-and-spout assembly with third preferred embodiment nozzle body assembly and fifth preferred embodiment spout according to the present invention.
Figure 19C:
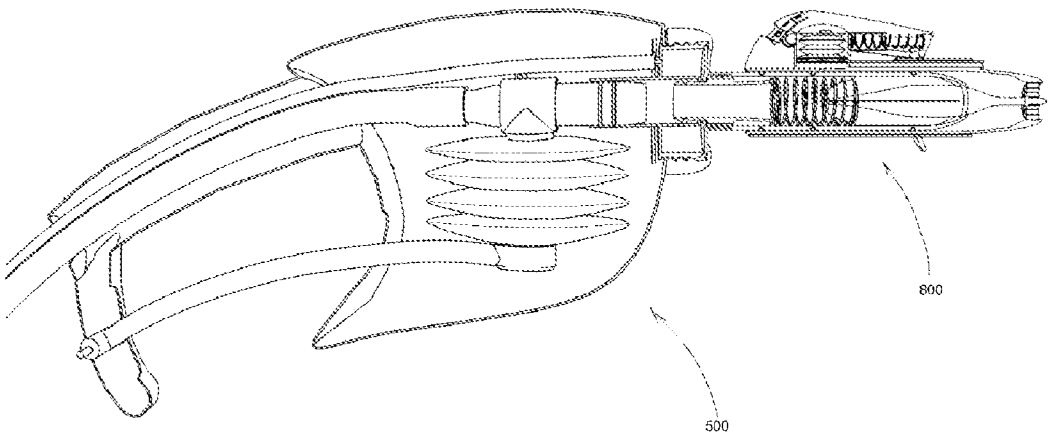
FIG. 19C is a cut-away side elevational view similar to FIG. 18, showing the sixth preferred embodiment nozzle-and-spout assembly with third preferred embodiment nozzle body assembly and sixth preferred embodiment spout according to the present invention.
Figure 20:
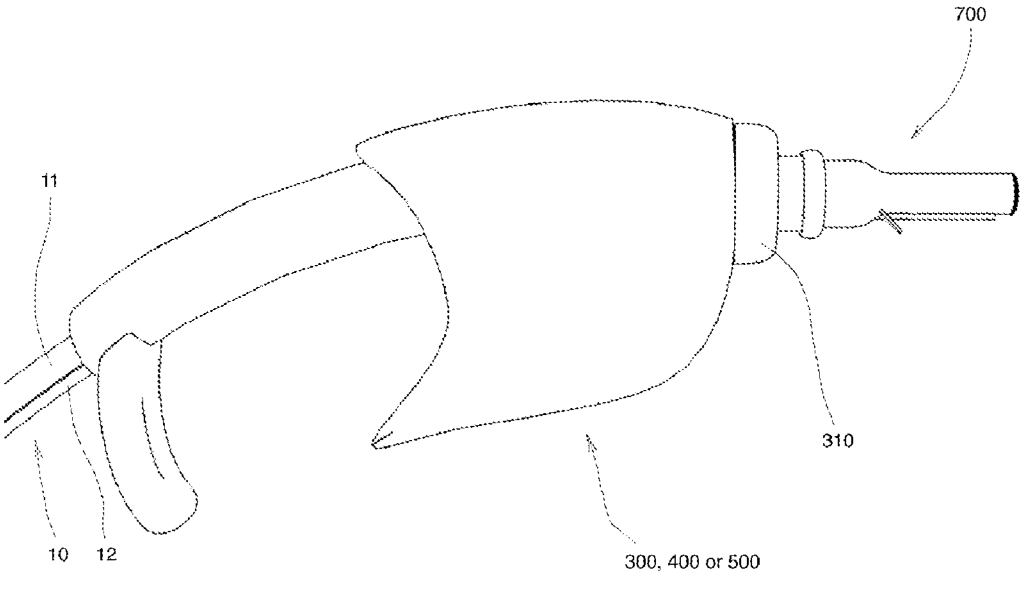
FIG. 20 shows the fifth preferred embodiment nozzle-and-spout assembly according to the present invention.
Figure 21:
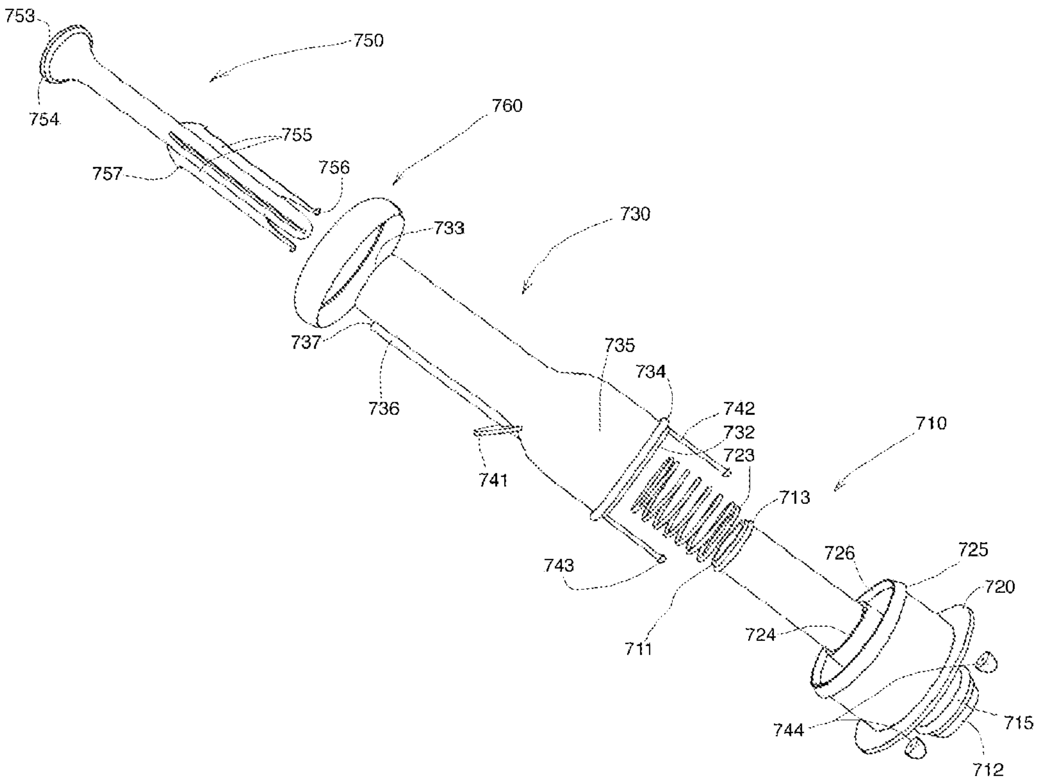
FIG. 21 is an exploded perspective view of the fifth preferred embodiment spout according to the present invention.
Figure 22A:
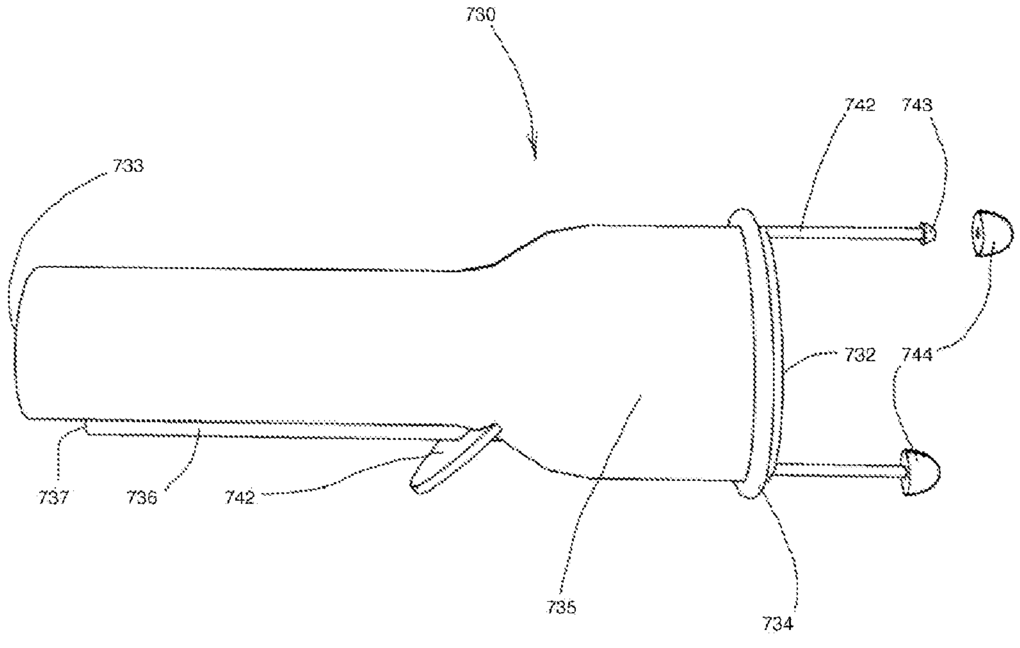
FIG. 22A is a side elevational view of the spout trigger of the fifth preferred embodiment spout of FIG. 24.
Figure 22B:
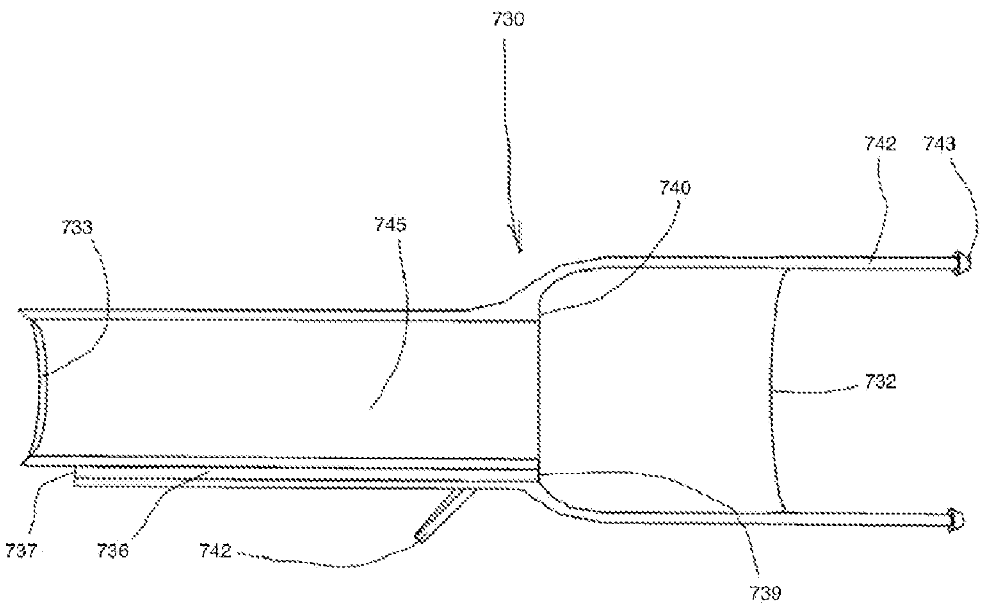
FIG. 22B is a cut-away side elevational view of the spout trigger of FIG. 22A with the air valve pin grommets removed for the sake of clarity.
Figure 23A:
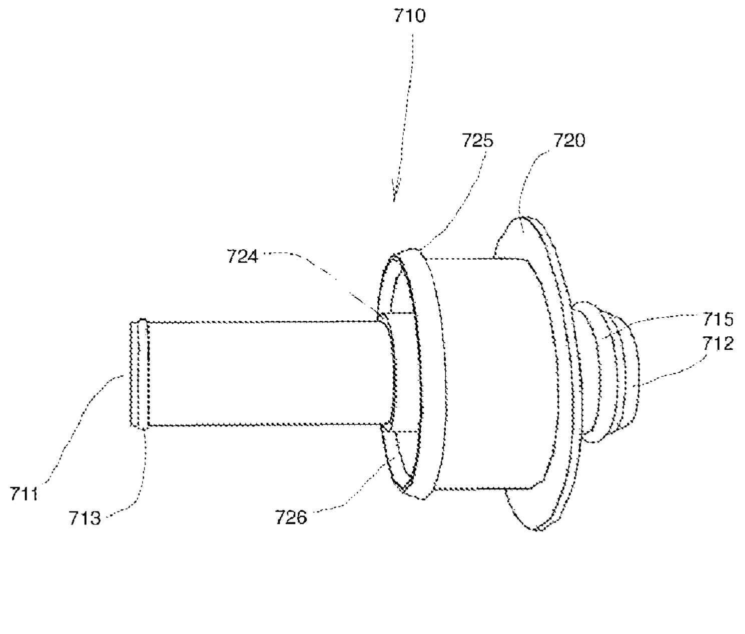
FIG. 23A is a perspective view of the spout trunk of the fifth preferred embodiment spout of FIG. 24; and, FIG. 23B is cut-away side elevational view of the spout trunk of FIG. 23A.
Figure 23B:
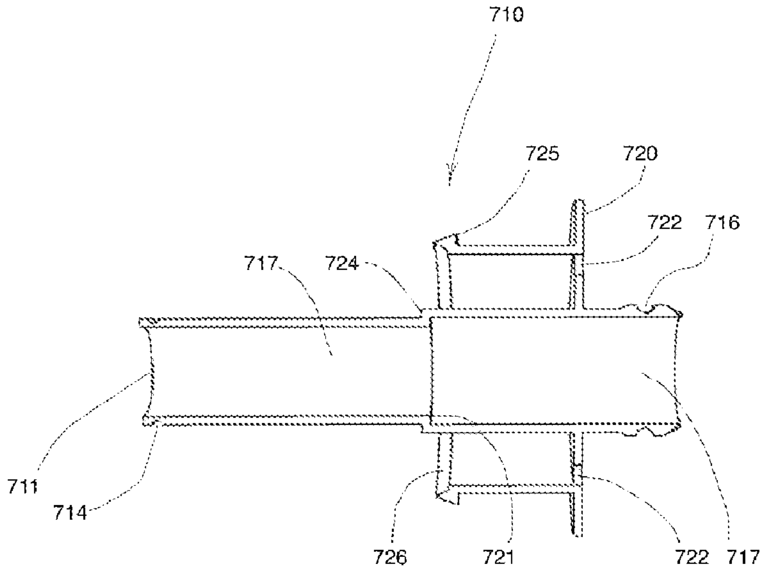

Referring to FIGS. 1 through 23B of the drawings, it will be noted that FIGS. 1 through 1D illustrate a first preferred embodiment of the liquid delivery system of the present invention, FIG. 1E illustrates a first alternative embodiment of the container coupling means of the present invention, FIG. 2A illustrates a first alternative embodiment of the liquid delivery system of the present invention, FIGS. 3A and 3B illustrates a second preferred embodiment of the liquid delivery system of the present invention, FIGS. 4 through 5B illustrate a third preferred embodiment of the liquid delivery system of the present invention, FIGS. 6A and 6B illustrate a fourth preferred embodiment of the liquid delivery system of the present invention, FIGS. 7A and 7B illustrate a fifth preferred embodiment of the liquid delivery system of the present invention, FIGS. 8A and 8B illustrate a sixth preferred embodiment of the liquid delivery system of the present invention, FIGS. 9A through 9C illustrate a first preferred embodiment of the nozzle-and-spout assembly of the present invention, FIG. 10A illustrates a second preferred embodiment of the nozzle-and-spout assembly of the present invention, FIG. 10B illustrates a third preferred embodiment of the nozzle-and-spout assembly of the present invention, FIG. 11A illustrates a first preferred embodiment of the nozzle body assembly of the present invention, FIG. 11B illustrates a first preferred embodiment of the two channel spout coupler of the present invention, FIG. 11C illustrates a second preferred embodiment of the two channel spout coupler of the present invention, FIGS. 12A and 13 illustrate the fourth preferred embodiment of the nozzle-and-spout assembly of the present invention with the first preferred embodiment of the nozzle body assembly and the fourth preferred embodiment of the spout of the present invention, FIGS. 12B, 14A and 14B illustrate the fifth preferred embodiment of the nozzle-and-spout assembly of the present invention with the first preferred embodiment of the nozzle body assembly and the fifth preferred embodiment of the spout of the present invention, FIGS. 12C, 15A and 15B illustrate the sixth preferred embodiment of the nozzle-and-spout assembly of the present invention with the first preferred embodiment of the nozzle body assembly and the sixth preferred embodiment of the spout of the present invention, FIG. 16A illustrates the second preferred embodiment of the nozzle body assembly of the present invention, FIG. 16B illustrates the third preferred embodiment of the two channel spout coupler of the present invention, FIG. 16C illustrates the fourth preferred embodiment of the two channel spout coupler of the present invention, FIG. 17A illustrates the fourth preferred embodiment of the nozzle-and-spout assembly of the present invention with the second preferred embodiment nozzle body assembly and the fourth preferred embodiment spout, FIG. 17B illustrates the fifth preferred embodiment of the nozzle-and-spout assembly of the present invention with the second preferred embodiment nozzle body assembly and the fifth preferred embodiment spout, FIG. 17C illustrates the sixth preferred embodiment of the nozzle-and-spout assembly of the present invention with the second preferred embodiment nozzle body assembly and the sixth preferred embodiment spout, FIG. 18 illustrates the third preferred embodiment of the nozzle body assembly of the present invention, FIG. 19A illustrates the fourth preferred embodiment of the nozzle-and-spout assembly of the present invention with the third preferred embodiment nozzle body assembly and the fourth preferred embodiment spout, FIG. 19B illustrates the fifth preferred embodiment of the nozzle-and-spout assembly of the present invention with the third preferred embodiment nozzle body assembly and the fifth preferred embodiment spout, FIG. 19C illustrates the sixth preferred embodiment of the nozzle-and-spout assembly of the present invention with the third preferred embodiment nozzle body assembly and the sixth preferred embodiment spout, FIG. 20 illustrates the fifth preferred embodiment of the nozzle-and-spout assembly of the present invention with the fifth preferred embodiment spout, and FIGS. 21 through 24 illustrate the fifth preferred embodiment of the spout of the present invention.

Reference will now be made to FIGS. 1 through 1E, which show a first preferred embodiment of the liquid delivery system of the present invention, as indicated by general reference numeral 1. The liquid delivery system 1 is for supplying liquid, as indicated by the reference numeral 5 in FIG. 1A, from a portable container 20 to at least one selected remote destination 8 and removing vapor from the at least one selected remote destination 8. The liquid delivery system 1 comprises a portable container 20 having a substantially hollow interior 7 for retaining liquid 9 therein.

There is an elongate flexible liquid delivery hose 11 having a liquid inlet 14 and a liquid outlet 13. The elongate flexible liquid delivery hose 11 is in fluid communication at the liquid inlet 14 with the substantially hollow interior 7 of the portable container 20 for receiving liquid from the portable container 20, and in fluid communication at the liquid outlet 13 with the at least one selected remote destination 8 for delivering the received liquid to the at least one selected remote destination 8.

There is also an elongate flexible vapor recovery hose 12 having a vapor inlet 16 and a vapor outlet 15. The elongate flexible vapor recovery hose 12 is in fluid communication at the vapor inlet 16 with the at least one selected remote destination 8 for receiving vapor from the at least one selected remote destination 8, and is in fluid communication at the vapor outlet 15 with the substantially hollow interior 7 of the portable container 20 for delivering the received vapor to the substantially hollow interior 7 of the portable container 20. The elongate flexible liquid delivery hose 11 and the elongate flexible vapor recovery hose 12 together comprise a two line hose 10, and preferably are integrally formed one with the other.

As can be best seen in FIG. 1A, prior to use, the portable container 20 is sealed by means of a threaded cap 21 threadibly engaged on the container inlet 22, and an inlet cover 25 retained in place over the container inlet 22 by the threaded cap 21. When configured for use, as shown in FIG. 1B, the inlet cover 25 is replaced by a container coupling means in the form of a two-line container coupling means 30 that is shown in FIG. 1C and shown enlarged in detail in FIG. 1D. The container coupling means 30 has a liquid supply connection means that comprises a liquid supply nipple 38 and a vapor recovery connection means that comprises a vapor recovery nipple 39. The elongate flexible liquid delivery hose 11 is connected in fluid communication to the liquid supply nipple 38 and the elongate flexible vapor recovery hose 12 is connected in fluid communication to the vapor recovery nipple 39. There is also liquid inlet nipple 37 axially aligned with and in fluid communication with the liquid supply nipple 38. A liquid supply hose 26 is connected in fluid communication to the liquid inlet 14 via nipple 37 for delivering liquid from the portable container 20 to the elongate flexible liquid delivery hose 11. A user would start the flow of liquid through the elongate flexible liquid delivery hose 11 by tilting the portable container to thereby pour the liquid. The portable container 20 could subsequently be set down and the liquid allowed to siphon out of the portable container 20.

Preferably, there is a check valve 31 disposed within the container coupling means 30 for precluding the flow of liquid back into the portable container 20, and a check valve 32 disposed in a co-operating annular orifice 33 that is axially aligned with the vapor passageway 35 of the vapor recovery nipple 39.

The elongate flexible liquid delivery hose 11 and the elongate flexible vapor recovery hose 12 permit the movement of the liquid outlet 13 of the elongate flexible liquid delivery hose 11 to the at least one selected remote destination 8 while the container remains substantially stationary, to thereby permit the delivery of the liquid to the at least one selected remote destination 8. Reduced air pressure in the substantially hollow interior 7 of the portable container 20 resulting from the removal of the liquid from the substantially hollow interior 7 of the portable container 20 causes vapor to be suctioned via the elongate flexible vapor recovery hose 12 into the substantially hollow interior 7 of the portable container 20.

Reference will now be made to FIG. 1E, which shows an alternative embodiment two-line container coupling means 36. The alternative embodiment two-line container coupling means 36 is similar to the two-line container coupling means 30 except that it has a female thread and acts to replace the containers threaded cap 21.

Reference will now be made to FIGS. 2A and 2B which show the first alternative embodiment of the liquid delivery system according to the present invention, as indicated by the reference 2. FIG. 2A shows the integrally formed elongate flexible liquid delivery hose and elongate flexible vapor recovery hose 10=shown connected to the portable container 20=, and FIG. 2B is an enlarged perspective view of the first alternative embodiment of the liquid delivery system 2 of FIG. 2A, but with the integrally formed elongate flexible liquid delivery hose and elongate flexible vapor recovery hose 10=shown disconnected from the portable container 20=. The liquid supply nipple 53 and the vapor recovery nipple 54 extend outwardly from the bottom of the portable container 20=. Typically, the first alternative embodiment liquid delivery system is used to siphon the liquid in the portable container 20=to a remote destination (not specifically shown). Accordingly, the portable container 20=does not need to be tilted in order to cause the flow of liquid therefrom.

Reference will now be made to FIG. 3, which shows a second preferred embodiment of the liquid delivery system of the present invention, as indicated by general reference numeral 2, and to FIG. 10A, which separately shows the nozzle-and-spout assembly of FIG. 3. The second preferred embodiment liquid delivery system 2 is substantially the same as the first preferred embodiment liquid delivery system 1 as shown in FIGS. 1A through 1E, except for the addition of a nozzle-and-spout assembly, as indicated by the reference numeral 200. Accordingly, reference numerals used for describing the various components of the first preferred embodiment liquid delivery system 1 of FIGS. 1A through 1E, will be used to describe the same components in reference to the second preferred embodiment liquid delivery system 2 as shown in FIG. 3.

The second preferred embodiment liquid delivery system 2 is for supplying liquid, as indicated by the reference numeral 5 in the container, from a portable container 20 to at least one selected remote destination 8 and removing vapor from the at least one selected remote destination 8.

As mentioned above, the second preferred embodiment liquid delivery system further comprises a nozzle-and-spout assembly. The elongate flexible liquid delivery hose is operatively connected in supported relation to the nozzle-and-spout assembly, and the elongate flexible vapor recovery hose is operatively connected in supported relation to the elongate flexible liquid delivery hose. More specifically, the elongate flexible liquid delivery hose is operatively connected in liquid delivery relation to the nozzle-and-spout assembly and the elongate flexible vapor recovery hose is operatively connected in vapor receiving relation to the nozzle-and-spout assembly, as will be discussed in greater detail subsequently.

As can be seen in FIG. 10A, the spout 220 has a nozzle connection end 220*a* and a free end 220*b* and is a two-channel spout with a main channel 221 and a vapor recovery channel 222. The elongate flexible liquid delivery hose 11 extends through the main channel 221 such that the outlet 13 of the elongate flexible liquid delivery hose 11 is disposed adjacent the free end 220*b* of the spout 220. The inlet 16 of the elongate flexible vapor recovery hose 12 is connected in fluid communication to the vapor flow channel outlet 224 of the vapor flow channel 222 at the nozzle connection end 220*a* of the spout 220. The vapor flow channel inlet 223 of the vapor flow channel 222 is disposed at the free end 220*b* of the spout 220. A liquid channel plug 17 is insertable into the liquid outlet 13 of the elongate flexible liquid delivery hose 11, whereat it is retained in frictional relation. The liquid channel plug 17 precludes the escape of liquid from the liquid outlet 13 when the nozzle-and-spout assembly 200 is not in use.

Reference will now be made to FIG. 10B, which shows a third preferred embodiment nozzle-and-spout assembly according to the present invention, as indicated by the reference 670. The nozzle-and-spout assembly 670 comprises a nozzle body 350 and a spout 650. The third preferred embodiment spout 650 has a nozzle connection end 600*a* and a free end 600*b*, and is attached to the nozzle body 350 at its nozzle connection end 600*a*.

In the third preferred embodiment nozzle-and-spout assembly, the spout 650 comprises a two-channel spout that itself comprises a liquid flow channel 620 and a vapor flow channel 630. The liquid flow channel 620 has a liquid flow channel inlet 620*a* disposed at the nozzle connection end 600*a* of the spout 650 and a liquid flow channel outlet 620*b* disposed at the free end 600*b* of the spout 650. Similarly, the vapor flow channel 630 has a vapor flow channel inlet 630*a* disposed at the free end 600*b* of the spout 650 and a vapor flow channel outlet 630*b* disposed at the nozzle connection end 600*a* of the spout 650. As can be readily seen in FIG. 10B, the liquid flow channel outlet 620*b* and the vapor flow channel inlet 630*a* are disposed adjacent one to another at the free end

600*b* of the spout 650. Further, the liquid flow channel inlet 620*a* and the vapor flow channel outlet 630*b* are disposed adjacent to one another at the nozzle connection end 600*a* of the spout 650.

The elongate flexible liquid delivery hose 11 is operatively connected to the two-channel spout 650 at the liquid flow channel 620, specifically at the liquid flow channel inlet 620*a* in order to deliver liquid directly to the liquid flow channel 620. Similarly, the elongate flexible vapor recovery hose 12 is operatively connected to the two-channel spout 650 at the vapor flow channel 630, specifically at the vapor flow channel outlet 630*b*, in order to receive vapor directly from the vapor flow channel 630.

The free end 600*b* of the liquid flow channel 620 has an internally threaded tip 623 that receives a liquid channel plug 624 therein having a co-operating male thread. One skilled in the art will readily see that this is just an added feature and not necessary to the over all function of the two channel spout. As can be readily seen in FIG. 10B, the liquid flow channel 620 and the vapor flow channel 630 are separate and distinct one from the other, in order to keep the liquid being delivered and the recovered vapor separate one from the other.

Reference will now be made to FIGS. 9A through 9C which show the first preferred embodiment of the nozzle-and-spout assembly of the present invention, as indicated by reference 100 in FIGS. 9A through 9C, more thoroughly. In the first preferred embodiment nozzle-and-spout assembly, there is a nozzle body 350 and a spout 120. The spout 120 is only a single channel spout has a nozzle connection end 121 and a free end 122. The outlet 13 of the elongate flexible liquid delivery hose 11 and the inlet 16 of the elongate flexible vapor recovery hose 12 are disposed adjacent the free end 122 of the spout 120. A liquid channel plug 17 is insertable into the liquid outlet 13 of the elongate flexible liquid delivery hose 11, whereat it is retained in frictional relation. The liquid channel plug 17 precludes the escape of liquid from the liquid outlet 13 when the nozzle-and-spout assembly 200 is not in use.

Reference will now be made to FIGS. 4 through 5B, which show a third preferred embodiment of the liquid delivery system of the present invention, as indicated by general reference numeral 2=. The third preferred embodiment liquid delivery system 3 is substantially the same as the first preferred embodiment liquid delivery system 1 as shown in FIGS. 1A through 1E, and the second preferred embodiment liquid delivery system 2 as shown in FIG. 3, except for the addition of a pump means, specifically a foot operable pump, as indicated by the reference numeral 60 operatively connected to the portable container for causing the liquid therein to be pumped from the portable container to the at least one selected remote destination when the pump means is pumped.

Accordingly, reference numerals used for describing the various components of the first preferred embodiment liquid delivery system 1 of FIGS. 1A through 1E, and the second preferred embodiment liquid delivery system 2 as shown in FIG. 3, will be used to describe the same components in reference to the third preferred embodiment liquid delivery system 2 as shown in FIGS. 4, 5A and 5B.

The liquid delivery system 3 is for supplying liquid, as indicated by the reference numeral 5 in FIG. 1A, from a portable container 20 to at least one selected remote destination 8 and removing vapor from the at least one selected remote destination 8. The liquid delivery system 3 comprises a portable container 20 having a substantially hollow interior 7 for retaining liquid 9 therein.

As mentioned above, the foot operable pump is operatively connected to the portable container for receiving liquid from the portable container 20 and for causing the liquid therein to be pumped from the portable container to the at least one selected remote destination when the foot operable pump 60 is pumped, as will be discussed in greater detail subsequently.

There is an elongate flexible liquid delivery hose 11 having a liquid inlet 14 and a liquid outlet 13. The elongate flexible liquid delivery hose 11 is operatively connected to the foot operable pump 60. More specifically, the elongate flexible liquid delivery hose 11 is in fluid communication at the liquid inlet 14 with the foot operable pump 60 for receiving liquid from the portable container 20, via a container coupling means in the form of a two-line container coupling means 61 that is shown in FIGS. 4 and 5A and shown enlarged in detail in FIG. 5B. The container coupling means 61 is threadibly engaged via female thread 69 onto a cooperating male threaded neck 24 of the portable container 20. The container coupling means 61 has a liquid supply connection means that comprises a threaded pump end 68 and a vapor recovery connection means that comprises a vapor recovery nipple 63. The intake 60*a* of the foot operable pump 60 has a male threaded portion 60*b* that threadibly engages the threaded pump end 68 so as to be in fluid communication therewith. The elongate flexible liquid delivery hose 11 is connected in fluid communication to the liquid supply nipple (not specifically shown) of the foot operable pump 60, and the elongate flexible vapor recovery hose 12 is connected in fluid communication to the vapor recovery nipple 63.

The elongate flexible liquid delivery hose 11 is either in fluid communication at the liquid outlet 13 with the at least one selected remote destination 8 for delivering the received liquid to the at least one selected remote destination 8 or the liquid outlet 13 of the elongate flexible liquid delivery hose is operatively connected in supported relation to the nozzle-and-spout assembly, and the elongate flexible vapor recovery hose is operatively connected in supported relation to the elongate flexible liquid delivery hose. More specifically, the elongate flexible liquid delivery hose is operatively connected in liquid delivery relation to the nozzle-and-spout assembly and the elongate flexible vapor recovery hose is operatively connected in vapor receiving relation to the nozzle-and-spout assembly, as will be discussed in greater detail subsequently.

There is also an elongate flexible vapor recovery hose 12 having a vapor inlet 16 and a vapor outlet 15. The elongate flexible vapor recovery hose 12 is in fluid communication at the vapor inlet 16 either directly or via a nozzle-and-spout assembly with the at least one selected remote destination 8 for receiving vapor from the at least one selected remote destination 8, and is in fluid communication at the vapor outlet 15 with the substantially hollow interior 7 of the portable container 20 for delivering the received vapor to the substantially hollow interior 7 of the portable container 20. The elongate flexible liquid delivery hose 11 and the elongate flexible vapor recovery hose 12 together comprise a two line hose 10, and preferably are integrally formed one with the other.

The vapor outlet 15 is in fluid communication with the substantially hollow interior 7 of the portable container 20 via the two-line container coupling means 61.

There is also liquid inlet nipple 67 axially aligned with and in fluid communication with the threaded pump end 68. A liquid supply hose 26 is connected in fluid communication to the liquid inlet nipple 67 for receiving liquid from the portable container 20.

Preferably, there is a check valve 31 disposed within the container coupling means 60 for precluding the flow of liquid back into the portable container 20. The check valve 31 is disposed in a co-operating passageway 66 that is axially aligned with the passageway 65 of the liquid inlet nipple 67 and also with the threaded pump end 68.

There is also a check valve 32 disposed in a co-operating aperture 64 that is axially aligned with the vapor passageway 62 of the vapor recovery nipple 63.

The elongate flexible liquid delivery hose 11 and the elongate flexible vapor recovery hose 12 permit the movement of the liquid outlet 13 of the elongate flexible liquid delivery hose 11 to the at least one selected remote destination 8 while the container remains substantially stationary, to thereby permit the delivery of the liquid to the at least one selected remote destination 8. Reduced air pressure in the substantially hollow interior 7 of the portable container 20 resulting from the removal of the liquid from the substantially hollow interior 7 of the portable container 20 causes vapor to be suctioned via the elongate flexible vapor recovery hose 12 into the substantially hollow interior 7 of the portable container 20.

As can be seen in FIG. 4, the third preferred embodiment liquid delivery system 3 of the present invention includes the first preferred embodiment nozzle-and-spout assembly 200. As discussed previously, the elongate flexible liquid delivery hose 11 and the elongate flexible vapor recovery hose 12 are operatively connected in supported relation to the nozzle-and-spout assembly 200. More specifically, the elongate flexible liquid delivery hose 11 is operatively connected in liquid delivery relation to the nozzle-and-spout assembly 200 and the elongate flexible vapor recovery hose 12 is operatively connected in vapor receiving relation to the nozzle-and-spout assembly 200, in the same manner as discussed above with reference to the nozzle-and-spout assembly 200.

In use, the third preferred embodiment liquid delivery system 3 is assembled, as can be seen in FIG. 5A, with the portable container 20 in an upright orientation. Subsequently, so that liquid may be pumped from the portable container 20, portable container 20 is tilted to an orientation is shown in FIG. 4. In this orientation, liquid is supplied from the portable container 20 into the foot operable pump 60, through the two-line container coupling means 61. When the foot operable pump 60 is pumped, liquid from the foot operable pump 60 is pumped through the elongate flexible liquid delivery hose 11 to the nozzle-and-spout assembly 200, and out of the nozzle-and-spout assembly 200 to the remote destination 8.

It can also readily be seen that the present invention comprises a method of supplying liquid from a portable container to at least one selected remote destination and removing vapor from the at least one selected remote destination. The method basically comprises the steps of first supplying liquid to a remote destination via an elongate flexible liquid delivery hose, wherein the elongate flexible liquid delivery hose is in fluid communication with a portable container, preferably by pumping liquid to the remote destination via the elongate flexible liquid delivery hose, and delivering the liquid from a nozzle-and-spout assembly. Further, this step preferably comprises the step of moving the nozzle-and-spout assembly while the portable container remains stationary. In this manner, it is easy and convenient to fill just about any type of remote destination container, at any convenient height, or fill more than one remote destination container, without having the inconvenience of moving, lifting and/or tilting portable container.

The subsequent step basically involves suctioning vapor from the destination to the portable container through an elongate flexible vapor recovery hose, wherein the elongate flexible vapor recovery hose is in fluid communication with the portable container, and wherein low air pressure in the portable container, as caused by the removal of liquid from the portable container, causes the suctioning of the vapor.

Reference will now be made to FIGS. 6A and 6B, which show a fourth preferred embodiment of the liquid delivery system of the present invention, as indicated by the reference numeral 4. The fourth preferred embodiment liquid delivery system 4 is substantially the same as the third preferred embodiment liquid delivery system 3 as shown in FIGS. 4, 5A and 5B, except that the elongate flexible vapor recovery hose 12 is attached at its vapor outlet 15 to a barbed vapor recovery nipple 72. Further, the container coupling means 90 does not accommodate the elongate flexible vapor recovery hose 12, only the elongate flexible liquid delivery hose 11.

Reference will now be made to FIGS. 7A and 7B, which show a fifth preferred embodiment of the liquid delivery system of the present invention, as indicated by the reference numeral 5. The fifth preferred embodiment liquid delivery system 5 is substantially the same as the fourth preferred embodiment liquid delivery system 4 as shown in FIGS. 6A and 6B, except the foot operable pump 81 is integrally formed with the portable container 80. The foot operable pump 81 has a (not specifically shown) that is covered by a container coupling means 82 that is retained in place there on my means all of a threaded cap 21. The container coupling means 82 as a barbed liquid supply nipple 84 and a barbed vapor recovery nipple 83. The elongate flexible liquid delivery hose 11 connects in fluid communication to the liquid supply nipple 84 then the elongate flexible vapor recovery hose 12 connects in fluid communication to the vapor recovery nipple 83.

Reference will now be made to FIGS. 8A and 8B, which show a sixth preferred embodiment of the liquid delivery system of the present invention, as indicated by the reference numeral 6. The sixth preferred embodiment liquid delivery system 6 is substantially the same as the fifth preferred embodiment liquid delivery system 5 as shown in FIGS. 7A and 7B, except that the elongate flexible vapor recovery hose 12 is attached at its vapor outlet 15 to a barbed vapor recovery nipple 87 on the portable container 85. Also, elongate flexible liquid delivery hose 11 is attached to a barbed liquid supply nipple 84 that is part of the foot operable pump 86. Further, the inlet cover 25 closes off the liquid supply outlet 86*a* of the foot operable pump 86.

Reference will now be made to FIGS. 11A through 12A and 13, which show the first preferred embodiment nozzle body assembly according to the present invention, as indicated by the reference numeral 300, and the first preferred embodiment two channel spout coupler 320 of the nozzle body assembly 300. In the first preferred embodiment nozzle body assembly 300, the two-channel spout 600 (see FIG. 13) is connected to the nozzle body 350 in removable and replaceable relation, specifically by means of a two-channel spout coupler 320. The first preferred embodiment two-channel spout coupler 320, as shown in FIG. 11B, has a liquid delivery connection means and a vapor recovery connection means. As illustrated, the liquid delivery connection means comprises a liquid delivery nipple 332 having a liquid flow passageway 330, and the vapor recovery connection means comprises a vapor recovery nipple 341 having a vapor flow passageway 340. The elongate flexible liquid delivery hose 11 is connected in fluid communication with the liquid delivery nipple 332, and the elongate flexible vapor recovery hose 12 is connected in fluid communication with the vapor recovery nipple 341. Further, there is an annular seat 333 for receiving the nozzle connection end 621 of the nozzle 600 therein, which annular seat 333 defines a liquid flow channel 331.

The two-channel spout coupler 320 also has an annular wall 324 that terminates in a front rim 321 and defines an air reservoir 640. A circular flange 326 extends peripherally outwardly from the base of the annular wall 324. The annular wall 324 extends through a front opening 351 in the front wall portion 352 of the nozzle body 350. The circular flange 326 seats between the front wall portion 352 of the nozzle body 350 and an annular flange 305, to preclude the two-channel spout coupler 320 from falling out of the nozzle body 350. A screw cap 310 threadibly engages the cooperating threads 322 on the annular wall 324 to secure a spout to the two-channel spout coupler 320.

The two-channel spout 600 has an annular flange 610 that is trapped in place between the front rim 321 and the annular wall 324 and the inwardly directed annular flange 311 of the screw cap 310. The end plug 621 at the nozzle connection end of the two-channel spout 600 has an AO@-ring 622 thereon. The AO@-ring 622 engages the inner sealing surface 331 of the annular seat 333, to preclude the escape of liquid from the liquid passageway 330 into the air reservoir 640.

The two-channel spout coupler 320 conveys the liquid from the elongate flexible liquid delivery hose 11 directly to the liquid flow channel 620 of the two-channel spout 600 via the liquid passageway 330. The two-channel spout coupler 320 also conveys the vapor from the vapor flow channel inlet 631, through the vapor flow channel 630 of the two-channel spout 600, through the air reservoir 640, and to the elongate flexible vapor recovery hose 12 via the vapor flow passageway 340 through nipple 341.

Reference will now be made to FIG. 11C, which shows the second preferred embodiment two channel spout coupler 360 of the nozzle-and-spout assembly 300. The second preferred embodiment two channel spout coupler 360 is similar to the first preferred embodiment two channel spout coupler 320 except that it additionally comprises a check valve 380 seated within and annular orifice 362 so as to be axially aligned with the liquid flow passageway 330 of the delivery nipple 332, and a check valve 32 seated within and annular orifice 361 so as to be axially aligned with the vapor flow passageway 340 of the vapor recovery nipple 341.

Reference will now be made to FIGS. 12B, 14A and 14B, which show the fifth preferred embodiment nozzle-and-spout assembly according to the present invention, which consists of the first preferred embodiment nozzle body assembly according to the present invention, as indicated by the reference numeral 300, and the fifth preferred embodiment spout according to the present invention, as indicated by the reference numeral 700. The fifth preferred embodiment spout 700 comprises a two-channel spout for delivering liquid to at least one selected remote destination and removing vapor from the at least one selected remote destination. The two-channel spout 700 is connectable to a nozzle body in removable and the replaceable relation where the spout is connected by means of two-channel spout coupler 320.

The two-channel spout comprises a main body, a liquid flow channel within the main body 717 & 743 and a vapor flow channel 736 within the main body. The liquid flow channel 717 & 743 has a liquid flow channel inlet 717*a* and a liquid flow channel outlet 745*b*. The vapor flow channel has a vapor flow channel inlet 737 and a vapor flow channel outlet 722. The liquid flow channel and the vapor flow channel are separate and distinct one from the other, and thereby permit liquid within the liquid flow channel and vapor within the vapor flow channel to be kept separate and distinct one from the other.

The spout 700 is the same as the fourth preferred embodiment two-channel spout 600 in that it mounts to the nozzle body assembly 300 in the same manner. A screw cap 310 threadibly engages the cooperating threads 322 on the annular wall 324 to secure the spout 700 to the two-channel spout coupler 320.

The two-channel spout 700 has an annular flange 720 that is trapped in place between the front rim 321 of the annular wall 324 and the inwardly directed annular flange 311 of the screw cap 310 creating air reservoir 727. The back end of the trunk at the nozzle connection end 717*a* of the two-channel spout 700 has an AO@-ring 715 thereon. The AO@-ring 715 engages the inner sealing surface 331 of the annular seat 333, to preclude the escape of liquid from the liquid passageway 330 into the air reservoir 727.

The spout 700 is different from the fourth preferred embodiment two-channel spout 600 in that it further comprises an auto-closure mechanism built into the two-channel spout 700. The two-channel spout 700 has two major cylindrical elements that move with respect to each other, namely a trunk and a slidable trigger. The slidable trigger 730 is slidably movable with respect to the trunk 710 between a forward closed position, as best seen in FIG. 14A, and a rearward open position, as best seen in FIG. 14B.

The trunk has a foreword reduced cylindrical portion, and an openable and closable fluid flow valve having an elongate cylindrical core 750 with fins 755 extending radially outwardly from the back half of the elongate cylindrical core 750, where the core 750 has widened head 753 with an AO@-ring 754 at the front end which seals against trigger opening 733. The fluid flow valve is opened as the trigger 730 is slid rearwardly to unseat o-ring 754 from trigger opening 733 and closed as spring 723 reaserts itself to push the trigger 730 forward. The core 750 is securely retained within the reduced cylindrical portion of the trunk 710 and is retained in place by an annual or flange 721 at its back that engages retension clips 756 on the core fins an annular shoulder at the trunks tip 711 which engage steps 757 on the fins 755.

The slidable trigger has an enlarged rearward cylindrical portion and a reduced foreword cylindrical portion. The enlarged rearward cylindrical portion defines an air cavity 738, through which vapor passes, as will discussed subsequently. A portion of the trunk is surrounded by the enlarged rearward cylindrical portion of the slidable trigger and a forward portion of the trunk is surrounded by the reduced foreword cylindrical portion of the slidable trigger. The fluid flow valve that extends forwardly from the trunk is surrounded by a portion of the reduced foreword cylindrical portion of the slidable trigger. An AO@-ring 713 retained on the foreword reduced cylindrical portion of the trunk seals against the inner surface of the reduced foreword cylindrical portion of the slidable trigger, to preclude liquid from entering the air cavity 738.

A trunk spring 723 is operatively mounted between the trunk and the slidable trigger bias the slidable trigger to its forward closed position, as best seen in FIG. 14A, whereat the AO@-ring 754 seals against the beveled AO@-ring sealing surface 733, to thereby close off the spout 700 to prevent fluid from flowing through the spout 700. The slidable trigger is moved to its rearward open position when the trigger hook 741 engages the mouth of a remote destination container (not specifically shown).

There are two air valve pins 742 extending rearwardly from the enlarged rearward cylindrical portion of the slidable trigger. The air valve pins 742 each have a grommet gasket 744 retained in place on the end thereof by means of an enlarged grommet retaining portion 743. The air valve pins 742 each extend through a cooperating air hole 722 in the flange 720 of the trunk 710.

In use, when the slidable trigger is in its forward closeded position, as best seen in FIG. 14A, the AO@-ring 754 seals against the beveled AO@-ring sealing surface 733, to thereby close off the spout 700, as mentioned above, and the grommet gasket 744 seal off the respective air holes 722 to preclude vapor from passing therethrough. When the slidable trigger 730 is in its rearward open position, as best seen in FIG. 14B, the AO@-ring 754 is removed from sealing engagement against the beveled AO@-ring sealing surface 733. Accordingly, liquid can flow through the fluid channel 717 past the fluid flow valve, and out the forward end 745*b* of the two-channel spout 700. Further, vapor is suctioned into the vapor channel inlet 737, through the vapor channel 736, through the air cavity 738 in the enlarged rearward cylindrical portion of the slidable trigger, through the air holes 722 and into the air cavity 727 between the trunk 710 and coupler 320, whereat it is suctioned into the vapor inlet 16 of the elongate flexible vapor recovery hose 12, and to the portable container (not specifically shown).

The air valve feature in the two channel auto closure spout 700 is not necessary if the two channel auto closure spout is used in conjunction with two channel spout couplers 360, 460, which incorporate air check valves or container couplers (30,36,61,82), which incorporate air check valves.

Reference will now be made to FIGS. 12C, 15A and 15B, which show the sixth preferred embodiment nozzle-and-spout assembly according to the present invention the first preferred embodiment nozzle body assembly according to the present invention, as indicated by the reference numeral 300, and the sixth preferred embodiment spout according to the present invention, as indicated by the reference numeral 800. The sixth preferred embodiment spout 800 is somewhat similar to the fifth preferred embodiment two-channel spout 700 in that it comprises an auto-closure mechanism built into the two-channel spout 800, but also different than the fifth preferred embodiment two-channel spout 700 in that it comprises an auto-shutoff mechanism built into the two-channel spout 800.

The sixth preferred embodiment spout 800 comprises a two-channel spout for delivering liquid to at least one selected remote destination (not specifically shown) and removing vapor from the at least one selected remote destination. The two-channel spout 800 is connectable to a nozzle body 300 in removable and replaceable relation.

The spout 800 is the same as the fourth preferred embodiment two-channel spout 600 in that it mounts to the nozzle body assembly 300 in the same manner. A screw cap 310 threadibly engages the cooperating threads 322 on the annular wall 324 to secure the spout 800 to the two-channel spout coupler 320.

The two-channel spout 800 has an annular flange 805 that is trapped in place between the front rim 321 of the annular wall 324 and the inwardly directed annular flange 311 of the screw cap 310 creating air reservoir 881. The back end of the trunk at the nozzle connection end 810 of the two-channel spout 800 has an AO@-ring 811 thereon. The AO@-ring 811 engages the inner sealing surface 331 of the annular seat 333, to preclude the escape of liquid from the liquid passageway 330 into the air reservoir 881.

The auto-closure auto-shutoff spout 800 has a fluid channel defined by fluid channel 821 the fluid channel 820 and the Sliders fluid channel 830 and a vapor channel defined by air inlet 850, air channel 851, piston cylinder 860, hole in the bottom of the cylinder 861, Hole through trunk 822, Jets air cavity 813, Flange airway through the jets threads 814 which leads to the two channel spout couplers 320 air reservoir 881.

When the auto-closure auto-shutoff spout 800 is in the open orientation see FIG. 15B the Trunk cores o-ring 841 will have unsealed the Trunks tip 821 to allow fluid to flow through the spout 800. Liquid within the elongate flexible liquid delivery hose will then be allowed to flow through the liquid flow passageway 330 of the two channel coupler 320 into the Jet 812, down the length of the Trunk body 820 around the Trunks core 840, out the Trunks tip 820, into the interior of the Slider body 830 past the exit grate 803 and out of the spout 800 as well, vapor from the inlet 850 will travel through the air channel 851, into the piston cylinder 860, down the hole in the bottom of the cylinder 861, down the hole through trunk 822, into the Jets air cavity 813, through the flanges airway in the jets threads 814 into the two channel spout couplers 320 air reservoir 881 and through the recovery nipples 341 vapor flow passageway 340 into the elongate flexible vapor recovery hose.

The two-channel spout 800 has three major cylindrical elements that move with respect to each other, namely casing 823, a slider assembly 832 and a trigger assembly 871. The slidable trigger is slidably movable with respect to the trunk between a forward closed position, as best seen in FIG. 14A, and a rearward open position, as best seen in FIG. 14B.

The spout 800 comprises a casing 823 having a liquid flow channel inlet 815 to receive liquid from the elongate flexible vapor recovery hose 12, and a liquid flow channel 821, also referred to as the trunk tip opening, to dispense liquid to a remote destination (not specifically shown), either a permanent or portable container or receptacle, or the like, such as a portable fuel container, a fuel tank, and so on. The liquid flow channel inlet 815 and the liquid flow channel 821 are connected in fluid communication by a fluid channel discussed above.

There is an openable and closable valve, as indicated by the general reference numeral 101, for permitting and precluding, resectively, the dispensing of liquid from the dispensing outlet 821 of the casing 823. The valve 101 preferably comprises a closure member 840 such as a core for closing and opening the dispensing outlet 821. The closure member 840 is slidably retained with in the casing 823 for movement between its open position and its closed position. The valve 101, specifically, the closure member 840, is biased closed by means of a coil spring, specifically trunk spring 824, which is in compression. The trunk spring 824, which is compressed in between the jet 812 and the closure member 840, provides a force that pushes the closure member 840, towards the trunk tip 821. The trunk tip 821 is tapered to channel the flow of liquid to the closure member 840.

The closure member 840 has an "O"-ring 841 seated in a cooperating annular groove towards the front of the closure member 840. When the closure member 840 is in its closed position, as biased by the trunk spring 824, the "O"-ring 841 seats against the inner annular surface of the tip of 821 of the casing 823, which is the dispensing outlet of the casing 823. The dispensing opening 823 is sealed as the force of the trunk spring 824 compresses the "O"-ring 841 between the closure member 840 and the trunk tip 821 interior, thereby providing an airtight leak-proof seal.

When the closure member 840 is in its open position (see FIG. 15B), the "O"-ring 841 is separated in space relation from the inner annular surface of the tip 821 of the casing 823, thus permitting liquid flow between the closure member 840 and the dispensing outlet 821.

The spout 800 further comprises a slider assembly 832 mounted in sliding relation around the casing 823. The slider assembly 832 is movable between a forward position, and a rearward position. The forward position and the rearward position of the slider assembly 832 corresponds to the closed position and the open position, respectively, of the closure member 840. Accordingly, in order to open the valve generally referred to by 101, the slider assembly 832 is moved rearwardly, in an indirect manner, as will be discussed in greater detail subsequently.

The spout 800 also comprises a receptacle engaging trigger means generally referred to by 871 operatively mounted on the casing 823. More specifically, the receptacle engaging trigger means 871 comprises a trigger assembly disposed in sliding relation on the slider assembly 832. The receptacle engaging trigger means 871 includes an upper hook 833 and a lower hook 834 for engaging the inlet rim of a container 8. Each of the upper hook 833 and the lower hook 834 is connected to, and preferably formed as an integrally molded part of thereceptacle engaging trigger means 871.

The receptacle engaging trigger means 871, and more specifically the trigger assembly, are movable along the casing 823 between a valve-open position, and a valve-closed position. The trigger assembly 871 is biased to the forward valve-closed position by means of a trigger return spring 825 mounted in substantially surrounding relation on a trigger spring guide shaft 826 that extends rearwardly from the upper hook 833, and also seats in a trigger spring guide 827 on the slider assembly 832.

In the valve-closed position (see FIG. 15A) of the trigger assembly 871, the closure member 840 is biased closed by the trunk spring 824 such that the "O"-ring 841 seats against the inner annular surface of the tip of 821 of the casing 823. Accordingly, the valve 101 is closed. In the valve-open position (see FIG. 15B) of the trigger assembly 871, the closure member 840 is moved to its open position against the biasing of the trunk spring 824 such that the "O"-ring 841 disposed in space relation from the inner annular surface that defines the dispensing outlet 821, at the tip of the casing 823. Accordingly, the valve 101 is open, and liquid can flow through the casing 823 and out the dispensing outlet 821.

The spout 800 according to the present invention further comprises linkage means 872 operatively connecting the receptacle engaging trigger means 871 and the valve 101. The linkage means generally referred by 872 has an enabled configuration, and a disabled configuration. In its enabled configuration, the receptacle engaging trigger means 871 and the valve 101 are operatively connected such that movement of the receptacle engaging trigger means 871 from the valve-closed position to the valve-open position causes the valve 101 to open. More specifically, as can be best seen in FIGS. 15C and 15D the linkage means 872 transmits a rearwardly directed force from the receptacle engaging trigger means 871, specifically the upper hook 834 and the lower hook 833 and the trigger assembly 871, to the linkage means 872, as will be discussed in greater detail subsequently.

Figure 15E:
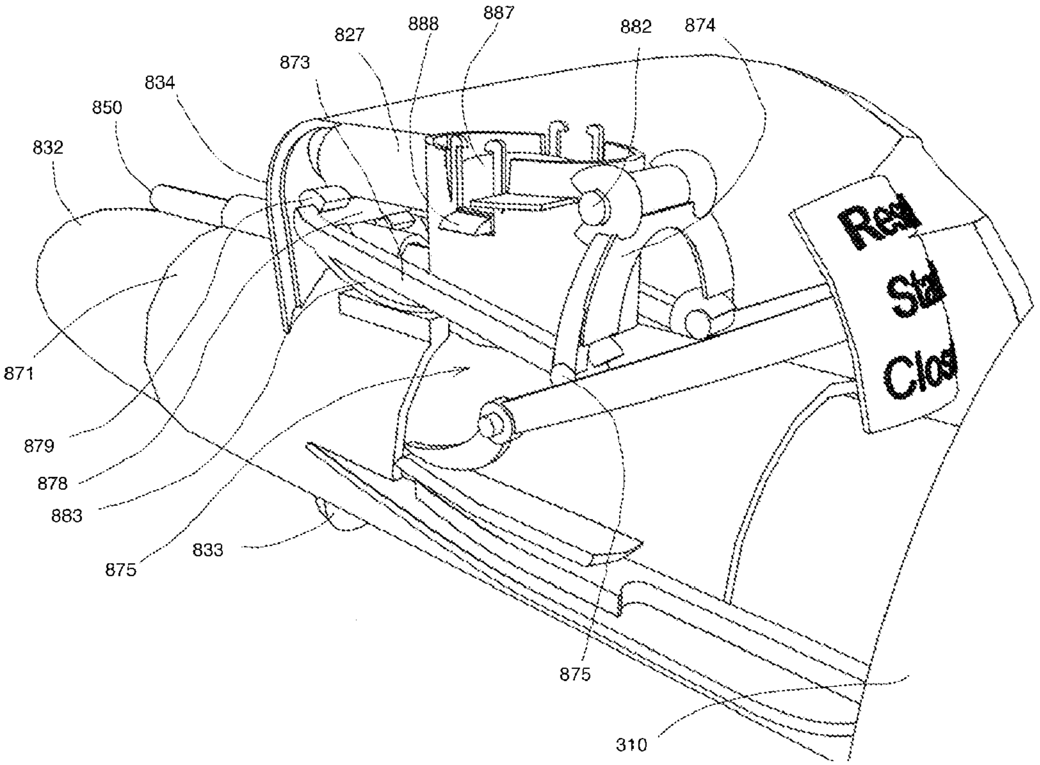
FIG. 15E is another cut-away view similar to FIGS. 15C and 15D, but in a disabled configuration.

In the disabled configuration, as in FIG. 15E the valve 101 is closed such that fluid cannot be dispensed from the dispensing outlet of the casing 823. Further, the valve 101 is precluded from being re-opened by movement of the receptacle engaging trigger means 871 until the linkage means 872 is reset to its enabled configuration as in FIG. 15C.

More specifically, the linkage means 872 comprises a first linkage member 873 and a second linkage member 874 connected together in angularly variable relation at a linkage elbow 875, so as together to be movable between the enabled configuration, and the disabled configuration. The first linkage member 873 and the second linkage member 874 each have two parallel identical arms, for the sake of redundancy and strength.

In the preferred embodiment, as illustrated, the first linkage member 873 and the second linkage member 874 are connected together in pivotal relation at the linkage elbow 875. A "C"-shaped axis clasp 876 disposed at the back end of each of the arms of the first linkage member 873 receives and retains in pivotal relation a slider linkage axis shaft 877 disposed that the front end of the second linkage member 874.

The first linkage member 873 is operatively mounted on the receptacle engaging trigger means 871 and the second linkage member 874 is operatively mounted on the slider assembly 832. Accordingly, the first linkage member 873 may be referred to as the trigger linkage member and the second linkage member 874 may be referred to as the slider linkage member. The trigger linkage member 873 has a trigger linkage axis shaft 878 disposed at its front end, which is received and retained in pivoting relation within a trigger linkage axis shaft clasp 879 that is integrally formed on the trigger assembly 871.

The slider linkage member 874 has a "C"-shaped axis clasp 882 disposed at the back end of each of the arms of the silder linkage member 874, which is received and retained in pivoting relation a slider linkage axis shaft 883 that is integrally formed on the slider assembly 832. When assembled together, the trigger linkage member 873 and the slider linkage member 874 are spring biased to the enabled configuration by means of a reed spring 883 connected to the trigger linkage member 873. Preferably, the reed spring 883 is integrally formed as part of the trigger linkage member 873.

The spout 800 further comprises a deactivation means for changing the linkage means 872 from the enabled configuration to the disabled configuration. The deactivation means includes a venturi means 885 disposed within the casing 823. More specifically, the venture means comprises a venturi that is disposed at the tip of the jet 812. As liquid leaves the jet tip 886, which is an integral part of the venturi, it will expand becoming turbulent. The expansion and the turbulence of the flow will cause the liquid to collect and mix with air and that air will exit the spout 800 with the liquid being dispensed through the dispensing outlet 138. The liquid flowing through the casing 823 will create a negative pressure within the trunk body 823 which will continually draws air into the trunk body 823 through airway 822 as the liquid is flowing. This negative pressure is the force which is used to change the linkage means 872 from its enabled configuration to its disabled configuration, as will be explained in greater detail subsequently.

The deactivation means also comprises an air conduit having an air inlet 850 at a front end thereof and an air outlet 886. When the spout 800 is in the open orientation, the air conduit is in fluid communication with the fluid flow channel 820, to interact with the venturi means 885. More specifically, the air conduit is in fluid communication with the fluid flow channel 820 via an air hole 861 in the slider assembly 832 and an expandable and retractable chamber 860 between the air conduit 851 and the air hole 861. The expandable and retractable chamber 860 comprises a bellows 887. Arms 888 extend laterally outwardly from opposite sides of the bellows 887, so as to be able to engage the linkage elbows 875 on each side of the linkage means 872.

The air conduit 851 is in fluid communication with the fluid flow channel 820, as described above, to permit the drawing of air into the fluid flow channel 820 through the air inlet 850 when the air pressure is reduced by the venturi means 885, but inhibiting the flow of air into the fluid flow channel 820 when the liquid level of dispensed liquid reaches the air inlet 850 and blocks access of air into the air inlet 850. When the airflow into the fluid flow channel 820 is inhibited, the air pressure within the expandable and retractable chamber 860 or cylinder produces a downward force on the bellows 887, thus lowering the bellows arms 888 from a raised position, to a lowered position. As the bellows 887 moves downwardly, the bellows arms 888 push on the trigger linkage member 873 and the slider linkage member 874 of the linkage means 872 at the linkage elbow 875. The trigger linkage member 873 and the slider linkage member 874 go from their enabled configuration as in FIG. 15C, past an over-the-center point, and essentially fall to their disabled configuration as in FIG. 15E. In this manner, the deactivation means has caused the linkage means 872 to change to the disabled configuration, which in turn causes the valve 101 to close, thus precluding the delivery of liquid from the dispensing outlet 821 of the casing 823.

In a more general sense, it can readily be seen that the deactivation means is an auto-shutoff feature for changing the linkage means 872 from the enabled configuration to the disabled configuration, in response to detecting the proximity of dispensed liquid in a receptacle, to thereby allow the valve 101 to close, thus precluding the delivery of liquid from the dispensing outlet 821 of the casing 823.

The two-channel spout further comprises a vapor flow channel within the main body. The vapor flow channel has a vapor flow channel inlet 850 and a vapor flow channel outlet 850*a*. The liquid flow channel within the main body has liquid flow inlet 815 and liquid flow outlet 821. The liquid flow channel and the vapor flow channel are separate and distinct one from the other, and thereby permit liquid within the liquid flow channel and vapor within the vapor flow channel to be kept separate and distinct one from the other.

In use, when the slidable trigger assembly is in its forward closed position, as best seen in FIG. 15A, the AO@-ring 841 seals against the tip 821 of the trunk, to thereby close off the spout 800, as mentioned above. When the slidable trigger is in its rearward open position, as best seen in FIG. 15B, the AO@-ring 841 is removed from sealing engagement against the tip 821 of the trunk. Accordingly, liquid can flow through the fluid channel 812 past the fluid flow valve, and out the forward end of the two-channel spout 800. Further, vapor is suctioned into the vapor channel inlet 850, through the vapor channel 851, through apertures 861 and 822 and into the air cavity 813 around the jet, then through the flange airway through the jets threads 814 which leads to the two channel spout couplers 320 and into the air cavity 881 between the trunk and coupler, whereat it is suctioned into the vapor inlet 16 of the elongate flexible vapor recovery hose 12, and to the portable container (not specifically shown).

Reference will now be made to FIGS. 16A through 16C, which show the second preferred embodiment nozzle body assembly according to the present invention, as indicated by the reference numeral 400. The second preferred embodiment nozzle body assembly is similar to the first preferred embodiment nozzle body assembly shown in FIG. 11A, but further comprises a valve means 470 operatively connected to the two-channel spout coupler 420 for controlling the flow of liquid into the two-channel spout coupler 420. The valve means comprises a flow control valve 470 operatively connected in fluid communication to the two-channel spout coupler 420. The elongate flexible liquid delivery hose 11 is operatively connected in fluid communication to the flow control valve 470. A trigger 450 is pivotally mounted on the nozzle body 400 via a trigger pivot shaft 451, and is used to open and close the control valve 470 via a control arm 471.

FIG. 16C shows a fourth preferred embodiment two-channel spout coupler 460 that is similar to the third preferred embodiment two-channel spout coupler 420, but additionally includes a liquid flow check valve 480 and a vapor flow check valve 32.

Reference will now be made to FIGS. 17A, 17B and 17C. FIG. 17A shows the second preferred embodiment nozzle body assembly 400, with the fourth preferred embodiment spout 600 attached thereto. FIG. 17B shows the second preferred embodiment nozzle body assembly 400, with the fifth preferred embodiment spout 700 attached thereto. FIG. 17C shows the second preferred embodiment nozzle body assembly 400, with the sixth preferred embodiment spout 800 attached thereto.

Reference will now be made to FIG. 18, which show the third preferred embodiment nozzle body assembly according to the present invention, as indicated by the reference numeral 500. The third preferred embodiment nozzle body assembly is similar to the first preferred embodiment nozzle body assembly shown in FIG. 11A, but further comprises a pump means 580 operatively connected to the two-channel spout coupler 420 for causing the flow of liquid into the two-channel spout coupler 420. The pump means comprises a bellows pump 470 operatively connected in fluid communication to the two-channel spout coupler 420. The elongate flexible liquid delivery hose 11 is operatively connected in fluid communication to the bellows pump 470. A trigger 550 is pivotally mounted on the nozzle body 350 via a trigger pivot shaft 551, and is used to actuate the bellows pump 580.

Reference will now be made to FIGS. 19A, 19B and 19C. FIG. 19A shows the third preferred embodiment nozzle body assembly 500, with the fourth preferred embodiment spout 600 attached thereto. FIG. 19B shows the third preferred embodiment nozzle body assembly 500, with the fifth preferred embodiment spout 700 attached thereto. FIG. 19C shows the third eighth preferred embodiment nozzle body assembly 500, with the sixth preferred embodiment spout 800 attached thereto.

As can be understood from the above description and from the accompanying drawings, the present invention provides a liquid delivery system for supplying liquid from a portable container to at least one selected remote destination and removing vapor from said at least one selected remote destination, which liquid delivery system is not limited to use where it is raised above the level of the receiving container, and tilted so that liquid flows from the dispensing nozzle into the receiving container, which liquid delivery system can be used in a more convenient manner such as where liquids are pumped from one computer container to another, and which liquid delivery system can be used with or without a pump, all of which features are unknown in the prior art.

Other variations of the above principles will be apparent to those who are knowledgeable in the field of the invention, and such variations are considered to be within the scope of the present invention. Further, other modifications and alterations may be used in the design and manufacture of the liquid delivery system of the present invention without departing from the spirit and scope of the accompanying claims.

I claim:

1. A liquid delivery system for supplying liquid from a portable container to at least one remote destination and removing vapor from said at least one remote destination, said liquid delivery system comprising:

a portable container for retaining liquid therein;

a liquid delivery hose having a liquid inlet and a liquid outlet, wherein said liquid delivery hose is in fluid communication at said liquid inlet with the portable container for receiving liquid from said portable container;

a vapor recovery hose having a vapor inlet and a vapor outlet, wherein said vapor recovery hose is in fluid communication at said vapor outlet with said portable container for delivering received vapor to said portable container; and a manually operable nozzle-and-spout assembly in fluid communication with the liquid delivery hose and the vapor recovery hose to receive liquid from the liquid outlet of the liquid delivery hose and to deliver vapor to the vapor inlet of the vapor recovery hose, the nozzle-and-spout assembly including a free end configured to dispense liquid to an open environment;

wherein said nozzle-and-spout assembly comprises:

a nozzle body; and a two-channel spout connected to said nozzle body in removable and replaceable relation by means of a two-channel spout coupler;

wherein said two-channel spout coupler comprises a liquid supply connection member and a vapor recovery connection member; and wherein said liquid delivery hose is connected in fluid communication with said liquid supply connection member, and said vapor recovery hose is connected in fluid communication with said vapor recovery connection member; and wherein, when liquid is removed from the portable container through operation of the nozzle-and-spout assembly, reduced air pressure in said portable container enables vapor to be suctioned via said vapor recovery hose into said portable container.

2. The liquid delivery system of claim 1, wherein said liquid delivery hose and said vapor recovery hose together comprise a two-line hose.

3. The liquid delivery system of claim 2, wherein said liquid delivery hose and said vapor recovery hose are integrally formed one with the other.

4. The liquid delivery system of claim 1, wherein said two-channel spout comprises a liquid flow channel and a vapor flow channel.

5. The liquid delivery system of claim 4, wherein said liquid flow channel has a liquid flow channel inlet and a liquid flow channel outlet, and said vapor flow channel has a vapor flow channel inlet and a vapor flow channel outlet, and said liquid flow channel outlet and said vapor flow channel inlet are disposed adjacent one to another.

6. The liquid delivery system of claim 4, wherein said liquid delivery hose is in fluid communication with said two-channel spout at said liquid flow channel.

7. The liquid delivery system of claim 4, wherein said vapor recovery hose is in fluid communication with said two-channel spout at said vapor flow channel.

8. The liquid delivery system of claim 1, wherein said liquid supply connection member comprises a liquid supply nipple and said vapor recovery connection member comprises a vapor recovery nipple.

9. The liquid delivery system of claim 1, wherein said two-channel spout coupler conveys said liquid from said liquid delivery hose to said liquid flow channel of said two-channel spout and conveys said vapor from said vapor flow channel of said two-channel spout to said vapor recovery hose.

10. The liquid delivery system of claim 1, wherein said spout has a nozzle connection end and a free end, and wherein said outlet of said liquid delivery hose and said inlet of said vapor recovery hose are disposed adjacent said free end of said spout.

11. The liquid delivery system of claim 4, wherein said two-channel spout has a nozzle connection end and a free end, and wherein said nozzle connection end has a liquid flow channel inlet and a vapor flow channel outlet, and wherein said liquid flow channel inlet and said vapor flow channel outlet are disposed adjacent to one another.

12. The liquid delivery system of claim 11, wherein said liquid flow channel and said vapor flow channel are separate and distinct one from the other.

13. The liquid delivery system of claim 1, further comprising a pump for pumping liquid from said portable container.

14. The liquid delivery system of claim 13, wherein said pump comprises a foot operable pump.

15. The liquid delivery system of claim 1 wherein the portable container, the liquid delivery hose, the vapor recovery hose and the nozzle-and-spout assembly are made of a material resistive to damage by liquid fuel and fuel vapors.

16. The liquid delivery system of claim 1 wherein the nozzle-and-spout assembly comprises an auto-closure mechanism for closing the free end when the nozzle-and-spout assembly is not operated to dispense liquid, the auto-closure mechanism comprising a fluid flow valve for controlling fluid flow through the nozzle-and-spout assembly, the fluid flow valve being moveable to an opened configuration when the nozzle-and-spout assembly is operated to dispense liquid and the fluid flow valve being biased to a closed configuration when the nozzle-and-spout assembly is not operated to dispense liquid.

17. The liquid delivery system of claim 1 wherein the nozzle-and-spout assembly comprises a deactivation mechanism for deactivating dispensing of liquid through the nozzle-and-spout assembly, the deactivation mechanism comprising:

an air conduit including an air inlet;

at least one linkage member connected to an operation mechanism of the nozzle-and-spout assembly, the at least one linkage member having an enabled configuration in which operation of the nozzle-and-spout assembly is enabled, and a disabled configuration in which operation of the nozzle-and-spout assembly is disabled; and a pressure sensor responsive to air pressure indicative of blockage of the air inlet to move the at least one linkage member into the disabled configuration when the air inlet is blocked.

18. The liquid delivery system of claim 1 wherein the nozzle-and-spout assembly comprises a bellows pump for manually pumping fluid from the portable container.

19. A liquid delivery system for supplying liquid from a portable container to at least one remote destination and removing vapor from said at least one remote destination, said liquid delivery system comprising:

a portable container for retaining liquid therein;

a pump for pumping liquid from said portable container;

a liquid delivery hose having a liquid inlet and a liquid outlet, wherein said liquid delivery hose is in fluid communication at said liquid inlet with said pump for receiving liquid from said pump;

a vapor recovery hose having a vapor inlet and a vapor outlet, wherein said vapor recovery hose is in fluid communication at said vapor outlet with said portable container for delivering the received vapor to said portable container; and a manually operable nozzle-and-spout assembly in fluid communication with the liquid delivery hose and the vapor recovery hose to receive liquid from the liquid outlet of the liquid delivery hose and to deliver vapor to the vapor inlet of the vapor recovery hose, the nozzle-and-spout assembly including a free end configured to dispense liquid to an open environment;

wherein said nozzle-and-spout assembly comprises:

a nozzle body; and a two-channel spout connected to said nozzle body in removable and replaceable relation by means of a two-channel spout coupler;

wherein said two-channel spout coupler comprises a liquid supply connection member and a vapor recovery connection member, and wherein said liquid delivery hose is connected in liquid delivery relation to said liquid supply connection member, and said vapor recovery hose is connected in vapor receiving relation to said vapor recovery connection member; and wherein, when liquid is removed from the portable container through operation of the nozzle-and-spout assembly, reduced air pressure in said portable container enables vapor to be suctioned via said vapor recovery hose into said portable container.

20. The liquid delivery system of claim 19, wherein said pump is in fluid communication with said liquid delivery hose.

21. The liquid delivery system of claim 19, wherein said liquid delivery hose and said vapor recovery hose together comprise a two-line hose.

22. The liquid delivery system of claim 21, wherein said liquid delivery hose and said vapor recovery hose are integrally formed one with the other.

23. The liquid delivery system of claim 19, wherein said two-channel spout comprises a liquid flow channel and a vapor flow channel.

24. The liquid delivery system of claim 23, wherein said liquid flow channel has a liquid flow channel inlet and a liquid flow channel outlet, and said vapor flow channel has a vapor flow channel inlet and a vapor flow channel outlet, and said liquid flow channel outlet and said vapor flow channel inlet are disposed adjacent one to another.

25. The liquid delivery system of claim 23, wherein said liquid delivery hose is in fluid communication with said two-channel spout at said liquid flow channel.

26. The liquid delivery system of claim 23, wherein said vapor recovery hose is in fluid communication with said two-channel spout at said vapor flow channel.

27. The liquid delivery system of claim 19, wherein said liquid supply connection member comprises a liquid supply nipple and said vapor recovery connection member comprises a vapor recovery nipple.

28. The liquid delivery system of claim 19, wherein said two-channel spout coupler conveys said liquid from said liquid delivery hose to said liquid flow channel of said two-channel spout and conveys said vapor from said vapor flow channel of said two-channel spout to said vapor recovery hose.

29. The liquid delivery system of claim 19, wherein said spout has a nozzle connection end and a free end, and wherein said outlet of said liquid delivery hose and said inlet of said vapor recovery hose are disposed adjacent said free end of said spout.

30. The liquid delivery system of claim 23, wherein said two-channel spout has a nozzle connection end and a free end, and wherein said nozzle connection end has a liquid flow channel inlet and a vapor flow channel outlet, and wherein said liquid flow channel inlet and said vapor flow channel outlet are disposed adjacent to one another.

31. The liquid delivery system of claim 30, wherein said liquid flow channel and said vapor flow channel are separate and distinct one from the other.

32. The liquid delivery system of claim 19, wherein said pump comprises a foot operable pump.

33. A hose assembly for supplying liquid from a portable container to at least one selected remote destination and removing vapor from said at least one selected remote destination, said hose assembly comprising:

a liquid delivery hose having a liquid inlet and a liquid outlet, said liquid delivery hose being adapted to be in fluid communication with a portable container at a liquid inlet of the liquid delivery hose; and, a vapor recovery hose having a vapor inlet and a vapor outlet, said vapor recovery hose being adapted to be in fluid communication with the portable container at a vapor outlet of the vapor recovery hose;

a manually operable nozzle-and-spout assembly in fluid communication with the liquid delivery hose and the vapor recovery hose to receive liquid from a liquid outlet of the liquid delivery hose and to deliver vapor to a vapor inlet of the vapor recovery hose, the nozzle-and-spout assembly including a free end configured to dispense liquid to an open environment; and at least one container coupling member for coupling said liquid delivery hose and said vapor recovery hose in fluid communication with the portable container;

wherein, when liquid is removed from the portable container through operation of the nozzle-and-spout assembly, reduced air pressure in said portable container enables vapor to be suctioned via said vapor recovery hose into said portable container.

34. The hose assembly of claim 33, wherein said liquid delivery hose and said vapor recovery hose together comprise a two-line hose.

35. The hose assembly of claim 34, wherein said liquid delivery hose and said vapor recovery hose are integrally formed one with the other.

36. The hose assembly of claim 33, wherein said at least one container coupling member comprises a liquid supply connection member and a vapor recovery connection member, and wherein said liquid delivery hose is in fluid communication with said liquid supply connection member, and said vapor recovery hose is in fluid communication with said vapor recovery connection member.

37. The hose assembly of claim 36, wherein said liquid supply connection member comprises a liquid supply nipple and said vapor recovery connection member comprises a vapor recovery nipple.

38. The hose assembly of claim 33, further comprising a pump for pumping liquid via the liquid delivery hose to be delivered by the nozzle-and-spout assembly.

39. The hose assembly of claim 33, wherein said nozzle-and-spout assembly comprises a nozzle body and a spout.

40. The hose assembly of claim 39, wherein said spout comprises a two-channel spout.

41. The hose assembly of claim 40, wherein said two-channel spout comprises a liquid flow channel and a vapor flow channel.

42. The hose assembly of claim 41, wherein said liquid flow channel has a liquid flow channel inlet and a liquid flow channel outlet, and said vapor flow channel has a vapor flow channel inlet and a vapor flow channel outlet, and said liquid flow channel outlet and said vapor flow channel inlet are disposed adjacent one to another.

43. The hose assembly of claim 41, wherein said liquid delivery hose is in fluid communication with said two-channel spout at said liquid flow channel.

44. The hose assembly of claim 41, wherein said vapor recovery hose is in fluid communication with said two-channel spout at said vapor flow channel.

45. The hose assembly of claim 40, wherein said two-channel spout is connected to said nozzle body in removable and replaceable relation.

46. The hose assembly of claim 45, wherein said two-channel spout is connected to said nozzle body in removable and replaceable relation by means of a two-channel spout coupler.

47. The hose assembly of claim 46, wherein said two-channel spout coupler comprises a liquid supply connection member and a vapor recovery connection member, and wherein said liquid delivery hose is in fluid communication with said liquid supply connection member, and said vapor recovery hose is in fluid communication with said vapor recovery connection member.

48. The hose assembly of claim 47, wherein said liquid supply connection member comprises a liquid supply nipple and said vapor recovery connection member comprises a vapor recovery nipple.

49. The hose assembly of claim 47, wherein said two-channel spout coupler conveys said liquid from said liquid delivery hose to said liquid flow channel of said two-channel spout and conveys said vapor from said vapor flow channel of said two-channel spout to said vapor recovery hose.

50. The hose assembly of claim 39, wherein said spout has a nozzle connection end and a free end, and wherein said outlet of said liquid delivery hose and said inlet of said vapor recovery hose are disposed adjacent said free end of said spout.

51. The hose assembly of claim 41, wherein said two-channel spout has a nozzle connection end and a free end, and wherein said nozzle connection end has a liquid flow channel inlet and a vapor flow channel outlet, and wherein said liquid flow channel inlet and said vapor flow channel outlet are disposed adjacent to one another.

52. The hose assembly of claim 51, wherein said liquid flow channel and said vapor flow channel are separate and distinct one from the other.

53. The hose assembly of claim 38, wherein said pump comprises a foot operable pump.

54. A hose assembly for supplying liquid from a portable container to at least one selected remote destination and removing vapor from said at least one selected remote destination, said hose assembly comprising:

a liquid delivery hose having a liquid inlet and a liquid outlet, said liquid delivery hose being adapted to be in fluid communication with a portable container at a liquid inlet of the liquid delivery hose; and, a vapor recovery hose having a vapor inlet and a vapor outlet, said vapor recovery hose being adapted to be in fluid communication with the portable container at a vapor outlet of the vapor recovery hose; and a manually operable nozzle-and-spout assembly in fluid communication with the liquid delivery hose and the vapor recovery hose to receive liquid from a liquid outlet of the liquid delivery hose and to deliver vapor to a vapor inlet of the vapor recovery hose, the nozzle-and-spout assembly including a free end configured to dispense liquid to an open environment;

wherein said nozzle-and-spout assembly comprises:

a nozzle body; and a two-channel spout connected to said nozzle body in removable and replaceable relation by means of a two-channel spout coupler;

wherein said two-channel spout coupler comprises a liquid supply connection member and a vapor recovery connection member, and wherein said liquid delivery hose is in fluid communication with said liquid supply connection member, and said vapor recovery hose is in fluid communication with said vapor recovery connection member; and wherein, when liquid is removed from the portable container through operation of the nozzle-and-spout assembly, reduced air pressure in said portable container enables vapor to be suctioned via said vapor recovery hose into said portable container.

55. A liquid delivery system for supplying liquid from a portable container to at least one remote destination and removing vapor from said at least one remote destination, said liquid delivery system comprising:

a portable container for retaining liquid therein;

a liquid delivery hose having a liquid inlet and a liquid outlet, wherein said liquid delivery hose is in fluid communication at said liquid inlet with the portable container for receiving liquid from said portable container;

a vapor recovery hose having a vapor inlet and a vapor outlet, wherein said vapor recovery hose is in fluid communication at said vapor outlet with said portable container for delivering received vapor to said portable container; and a manually operable nozzle-and-spout assembly in fluid communication with the liquid delivery hose and the vapor recovery hose to receive liquid from the liquid outlet of the liquid delivery hose and to deliver vapor to the vapor inlet of the vapor recovery hose, the nozzle-and-spout assembly including a free end configured to dispense liquid to an open environment;

wherein the nozzle-and-spout assembly comprises a deactivation mechanism for deactivating dispensing of liquid through the nozzle-and-spout assembly, the deactivation mechanism comprising:

an air conduit including an air inlet;

at least one linkage member connected to an operation mechanism of the nozzle-and-spout assembly, the at least one linkage member having an enabled configuration in which operation of the nozzle-and-spout assembly is enabled, and a disabled configuration in which operation of the nozzle-and-spout assembly is disabled; and a pressure sensor responsive to air pressure indicative of blockage of the air inlet to move the at least one linkage member into the disabled configuration when the air inlet is blocked; and wherein, when liquid is removed from the portable container through operation of the nozzle-and-spout assembly, reduced air pressure in said portable container enables vapor to be suctioned via said vapor recovery hose into said portable container.

* * * * *